(12) United States Patent
Sato

(10) Patent No.: US 10,455,495 B2
(45) Date of Patent: Oct. 22, 2019

(54) INFORMATION PROCESSING DEVICE, WIRELESS COMMUNICATION DEVICE, AND INFORMATION PROCESSING METHOD OF HANDLING INFORMATION RELATED TO WIRELESS COMMUNICATION

(71) Applicant: SONY CORPORATION, Tokyo (JP)

(72) Inventor: Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/531,620

(22) PCT Filed: Sep. 8, 2015

(86) PCT No.: PCT/JP2015/075428
§ 371 (c)(1),
(2) Date: May 30, 2017

(87) PCT Pub. No.: WO2016/098401
PCT Pub. Date: Jun. 23, 2016

(65) Prior Publication Data
US 2018/0242240 A1  Aug. 23, 2018

(30) Foreign Application Priority Data
Dec. 15, 2014  (JP) ................. 2014-252842

(51) Int. Cl.
*H04W 52/02* (2009.01)
*H04L 29/08* (2006.01)
(Continued)

(52) U.S. Cl.
CPC ....... *H04W 52/0206* (2013.01); *H04L 1/1887* (2013.01); *H04L 1/20* (2013.01);
(Continued)

(58) Field of Classification Search
CPC ......... H04L 1/12; H04L 1/1854; H04L 5/006; H04L 5/0062; H04L 5/0073
See application file for complete search history.

(56) References Cited

U.S. PATENT DOCUMENTS

2004/0005903 A1 * 1/2004 Dick .................... H04L 1/1803
455/513
2004/0137896 A1   7/2004 Sarkar et al.
(Continued)

FOREIGN PATENT DOCUMENTS

CA    2511515 A    7/2004
EP    2096782 A2   9/2009
(Continued)

OTHER PUBLICATIONS

"Low Throughput Networks (LTN); Protocols and Interfaces", ETSI GS LTN 003 V1.1.1, Sep. 2014, pp. 24.
(Continued)

*Primary Examiner* — Pao Sinkantarakorn
(74) *Attorney, Agent, or Firm* — Chip Law Group

(57) ABSTRACT

Interference caused by response signals is reduced. A wireless communication device includes a control unit. The control unit designates, in the case where a signal is transmitted to an information processing device using wireless communication, at least one of a decision method of deciding whether the information processing device transmits a response signal to the wireless communication device in response to the signal and a decision method of deciding a transmission timing of the response signal. The information processing device includes a control unit. The control unit autonomously controls transmission of a response signal to a wireless communication device in response to a signal from the wireless communication device in the case where the signal is received using wireless communication.

15 Claims, 19 Drawing Sheets

(51) Int. Cl.
*H04W 28/04* (2009.01)
*H04L 1/18* (2006.01)
*H04L 1/20* (2006.01)
*H04L 5/00* (2006.01)
*H04W 4/80* (2018.01)
*H04W 52/00* (2009.01)

(52) U.S. Cl.
CPC ............ H04L 5/0055 (2013.01); H04L 29/08 (2013.01); H04W 4/80 (2018.02); H04W 28/04 (2013.01); H04W 52/00 (2013.01); *H04W 52/0212* (2013.01); *Y02D 70/00* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01)

(56) References Cited

U.S. PATENT DOCUMENTS

| | | | | |
|---|---|---|---|---|
| 2005/0094600 | A1* | 5/2005 | Zhang | H04L 1/1887 370/331 |
| 2008/0287069 | A1 | 11/2008 | Yoshimura | |
| 2014/0004888 | A1* | 1/2014 | Ando | H04W 24/08 455/456.6 |
| 2014/0086222 | A1* | 3/2014 | Bao | H04L 1/1854 370/336 |
| 2015/0244486 | A1* | 8/2015 | Liang | H04L 5/0055 370/337 |
| 2016/0164655 | A1* | 6/2016 | Bao | H04L 1/1685 370/336 |

FOREIGN PATENT DOCUMENTS

| | | |
|---|---|---|
| JP | 2006-513642 A | 4/2006 |
| JP | 2008-288719 A | 11/2008 |
| JP | 2013-097408 A | 5/2013 |
| JP | 2013-97408 A | 5/2013 |
| KR | 10-2005-0097938 A | 10/2005 |
| WO | 2004/063852 A1 | 7/2004 |
| WO | 2013/061589 A1 | 5/2013 |
| WO | 2013/068559 A1 | 5/2013 |

OTHER PUBLICATIONS

"Low Throughput Networks (LTN); Protocols and Interfaces", ETSI GS LTN 003 V1.1.1, Sep. 2014, 24 pages.

International Search Report and Written Opinion of PCT Application No. PCT/JP2015/075428, dated Nov. 24, 2015, 02 pages of English Translation and 07 pages of ISRWO.

* cited by examiner

EXEMPLARY CONFIGURATION OF DATA FRAME

FIG. 13

EXEMPLARY CONFIGURATION OF DATA FRAME

| Preamble | SFD | TERMINAL ID | ACK Mode1 | ACK Mode2 | INFORMATION |
|---|---|---|---|---|---|
| 501 | 502 | 503 | 504 | 505 | 506 |

INFORMATION PROCESSING DEVICE, WIRELESS COMMUNICATION DEVICE, AND INFORMATION PROCESSING METHOD OF HANDLING INFORMATION RELATED TO WIRELESS COMMUNICATION

CROSS REFERENCE TO RELATED APPLICATIONS

This application is a U.S. National Phase of International Patent Application No. PCT/JP2015/075428 filed on Sep. 8, 2015, which claims priority benefit of Japanese Patent Application No. JP 2014-252842 filed in the Japan Patent Office on Dec. 15, 2014. Each of the above-referenced applications is hereby incorporated herein by reference in its entirety.

TECHNICAL FIELD

The present technology relates to a wireless communication device. More particularly, the present technology relates to an information processing device, a wireless communication device, and an information processing method of dealing with information related to wireless communication and a program causing a computer to perform the method.

BACKGROUND ART

A wireless communication technology of exchanging various data using wireless communication is known (for example, see Patent Literature 1 and Non-Patent Literature 1).

For example, data communication can be performed between a wireless communication device and a base station using a wireless local area network (LAN). In this case, a procedure called association is performed before the data communication is performed. When the association is performed, the wireless communication device and the base station are associated in a one-to-one manner.

CITATION LIST

Patent Literature

Patent Literature 1: WO 2013/068559 pamphlet

Non-Patent Literature

Non-Patent Literature 1: ETSI GS LTN 003 V1.1.1 (2014 September)

DISCLOSURE OF INVENTION

Technical Problem

In the technique of the related art described above, there is a possibility of a plurality of base stations receiving data transmitted from the wireless communication device. However, since the wireless communication device and the base station are associated in a one-to-one manner, the base station can decide whether an ACKnowledgment (ACK) response is transmitted on the basis of the association relation. Thus, it is possible to prevent interference caused by ACK transmission performed by a plurality of base stations.

Here, in recent years, wireless communication devices have been required to be reduced in a size and driven for long periods of time. For example, in general, since portable wireless communication devices operate with limited batteries, it is important to reduce power consumption of wireless communication devices. In this regard, power consumption of wireless communication devices can be considered to be reduced when procedures such as association are omitted.

However, in a wireless system in which data transmission is performed while omitting association, a transmission signal from a wireless communication device may be received by a plurality of base stations. In this case, when each base station transmits a reception response (ACK) on the basis of a reception result, a plurality of base stations are likely to transmit an ACK. For this reason, interference may occur when the wireless communication device receives the ACKs.

The present technology was made in light of this situation, and it is an object of the present technology to reduce interference caused by the response signals.

Solution to Problem

The present technology has been achieved in order to solve the above problem, and a first aspect is an information processing device, including: a control unit configured to autonomously control transmission of a response signal to a wireless communication device in response to a signal from the wireless communication device in the case where the signal is received using wireless communication, an information processing method performed by the information processing device, and a program for causing a computer to execute the method. Accordingly, an operation of autonomously controlling transmission of a response signal to a wireless communication device in response to a signal from the wireless communication device in the case where the signal is received using wireless communication is obtained.

According to the first aspect, the control unit may decide whether the response signal is transmitted to the wireless communication device on the basis of a received signal strength of the signal. Accordingly, an operation of deciding whether the response signal is transmitted to the wireless communication device on the basis of a received signal strength of the signal is obtained.

According to the first aspect, the control unit may decide whether the response signal is transmitted to the wireless communication device using a decision method based on a result obtained by comparing the received signal strength of the signal and a threshold value and a decision method of making a decision randomly. Accordingly, an operation of deciding whether the response signal is transmitted to the wireless communication device on the basis of a result obtained by comparing the received signal strength of the signal to a threshold value and a decision process based on a random number is obtained.

According to the first aspect, the control unit may randomly decide whether the response signal is transmitted to the wireless communication device. Accordingly, an operation of randomly deciding whether the response signal is transmitted to the wireless communication device is obtained.

According to the first aspect, the control unit may randomly decide whether the response signal is transmitted to the wireless communication device in the case where the received signal strength of the signal is within a predetermined range. Accordingly, an operation of randomly deciding whether the response signal is transmitted to the wireless communication device in the case where the received signal strength of the signal is within a predetermined range is obtained.

According to the first aspect, the control unit may randomly decide a timing at which the response signal is transmitted to the wireless communication device. Accordingly, an operation of randomly deciding a timing at which the response signal is transmitted to the wireless communication device is obtained.

According to the first aspect, the control unit may decide the timing at which the response signal is transmitted to the wireless communication device using a decision method based on a result obtained by comparing the received signal strength of the signal to a threshold value and a decision method of making a decision randomly. Accordingly, an operation of deciding the timing at which the response signal is transmitted to the wireless communication device on the basis of a result obtained by comparing the received signal strength of the signal to a threshold value and a decision process based on a random number is obtained.

According to the first aspect, the control unit may decide whether the response signal is transmitted to the wireless communication device on the basis of the received signal strength of the signal, and randomly decides a timing at which the response signal is transmitted to the wireless communication device in the case where the response signal is decided to be transmitted to the wireless communication device. Accordingly, an operation of deciding whether the response signal is transmitted to the wireless communication device on the basis of the received signal strength of the signal and randomly deciding a timing at which the response signal is transmitted to the wireless communication device in the case where the response signal is decided to be transmitted to the wireless communication device is obtained.

A second aspect of the present technology is a wireless communication device, including: a control unit configured to designate, in the case where a signal is transmitted to an information processing device using wireless communication, at least one of a decision method of deciding whether the information processing device transmits a response signal to the wireless communication device in response to the signal and a decision method of deciding a transmission timing of the response signal, an information processing method performed by the wireless communication device, and a program for causing a computer to execute the method. Accordingly, an operation of designating, in the case where a signal is transmitted to an information processing device using wireless communication, at least one of a decision method of deciding whether the information processing device transmits a response signal to the wireless communication device in response to the signal and a decision method of deciding a transmission timing of the response signal is obtained.

According to the second aspect, the control unit may transmit the signal by including information designating the decision method in the signal. Accordingly, an operation of transmitting the signal by including information designating the decision method in the signal is obtained.

According to the second aspect, the control unit may set a standby time for the response signal corresponding to the decision method in the case where the decision method of deciding the transmission timing is designated. Accordingly, an operation of setting a standby time for the response signal corresponding to the decision method in the case where the decision method of deciding the transmission timing is designated is obtained.

Advantageous Effects of Invention

According to the present technology, it is possible to obtain an excellent effect in which interference caused by response signals can be reduced. Note that the advantageous effects described above are not necessarily limitative, and the advantageous effects described in the present disclosure may be achieved.

BRIEF DESCRIPTION OF DRAWINGS

FIG. 13 is a diagram illustrating an exemplary configuration of a data frame when a wireless communication device 100 according to a fourth embodiment of the present technology performs data transmission.

MODE(S) FOR CARRYING OUT THE INVENTION

Hereinafter, modes for carrying out the present technology (hereinafter referred to as "embodiments") will be described. Description proceeds in the following order.
1. First embodiment (example of deciding whether ACK transmission is performed for each base station)
2. Second embodiment (example of deciding timing to transmit ACK for each base station)
3. Third embodiment (example of deciding whether ACK transmission is performed and deciding timing to transmit ACK when ACK transmission is decided to be performed)
4. Fourth embodiment (example of designating decision method related to ACK transmission on wireless communication device side)
5. Application examples 1. First Embodiment

[Exemplary Configuration of Communication System]

Figure 1:
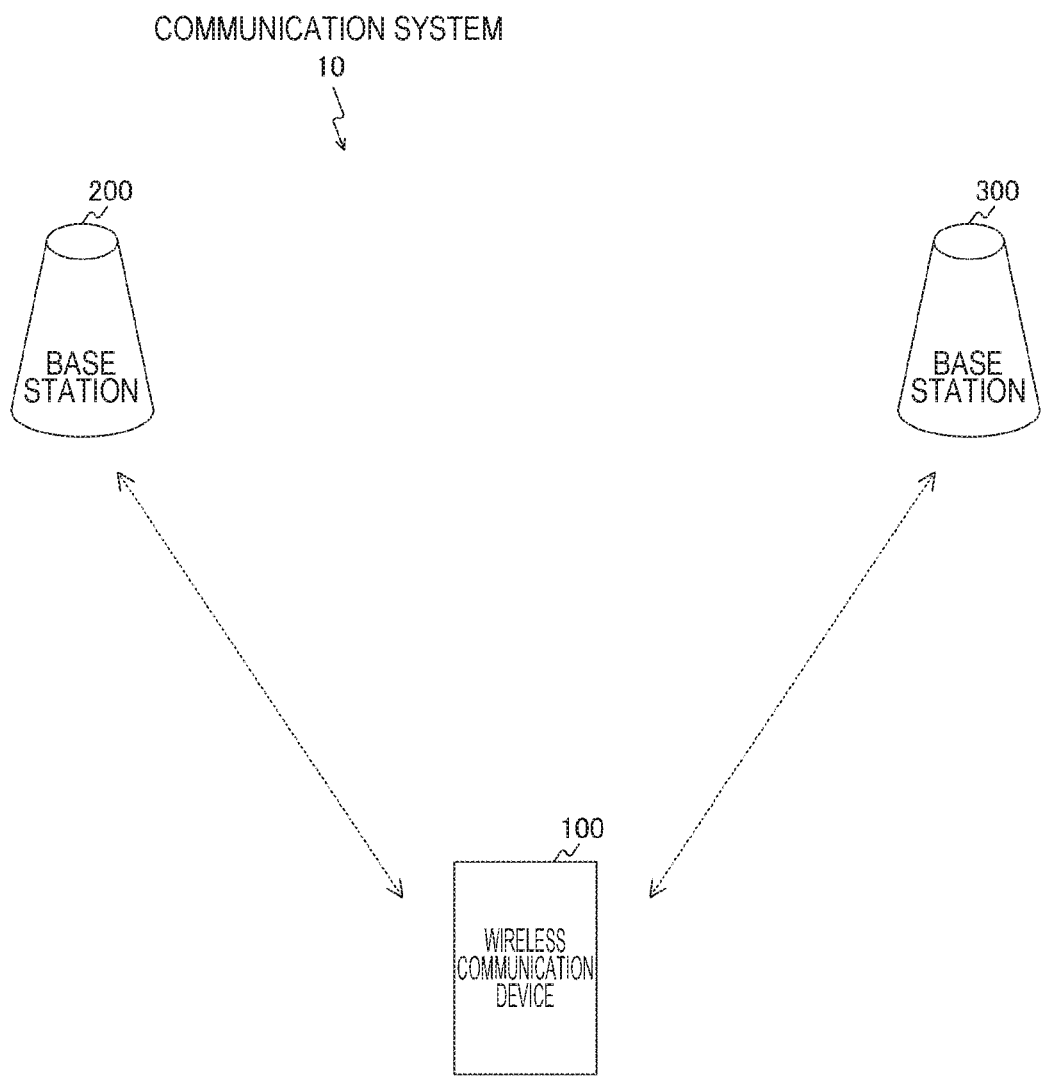
FIG. 1 is a diagram showing a system configuration example of a communication system 10 according to a first embodiment of the present technology.
Figure 2:
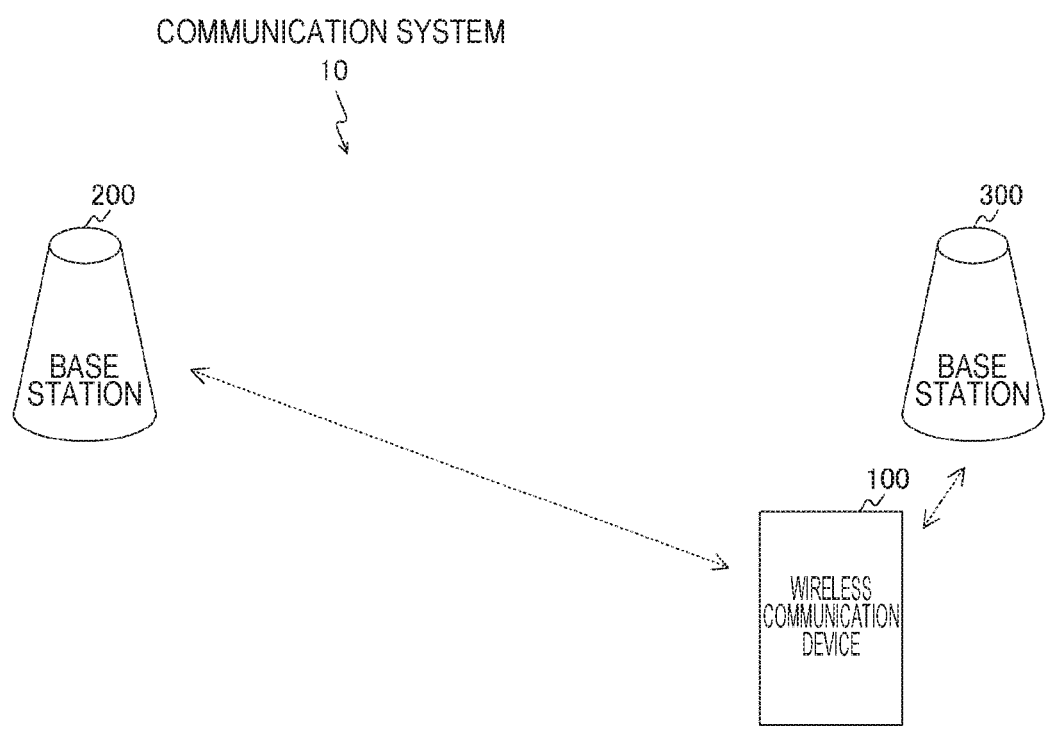
FIG. 2 is a diagram showing a system configuration example of a communication system 10 according to a first embodiment of the present technology.

FIGS. 1 and 2 are diagrams illustrating an exemplary system configuration of a communication system 10 according to a first embodiment of the present technology.

The communication system 10 includes a wireless communication device 100, a base station 200, and a base station 300. In FIGS. 1 and 2, communication paths between devices capable of exchanging information using wireless communication are schematically illustrated by dotted arrows. The base station 200 and the base station 300 are examples of an information processing device set forth in claims.

Further, FIG. 1 illustrates an example in which the wireless communication device 100 is located at a position at which a distance between the wireless communication device 100 and the base station 200 is substantially the same as a distance between the wireless communication device 100 and the base station 300. Further, FIG. 2 illustrates an example in which the wireless communication device 100 is located at a position at which the distance between the wireless communication device 100 and the base station 300 is smaller than the distance between the wireless communication device 100 and the base station 200.

The wireless communication device 100 is, for example, a portable type or fixed type information processing device and electronic equipment having a wireless communication function. A portable information processing device (electronic device) is, for example, an information processing device such as a smartphone, a mobile phone, or a tablet terminal, and a fixed information processing device (electronic device) is, for example, an information processing device such as a printer or a personal computer.

Further, the wireless communication device 100 may be, for example, an electronic device with less power consumption. The electronic device with low power consumption may employ, for example, Bluetooth (registered trademark) low energy (BLE) of transmitting sensor data (for example, a pulse rate, a body temperature, and a position). Further, the electronic device may be a device that can be worn by a person. For example, the electronic device may be a device that detects a sudden change of a person wearing it and detects that the person is fallen on the basis of the change, or a device that detects a heart attack or the like. Such detection information is transmitted to another information processing device (for example, a management server) via the base stations 200 and, 300 at the time of detection or at regular intervals. For example, an emergency notification (for example, information related to human life (for example, information for notifying of a heart attack or information for notifying of collapse)) is transmitted to another information processing device via the base stations 200 and 300 at the time of decision.

An exemplary configuration of the wireless communication device 100 will be described in detail with reference to FIG. 3. An exemplary configuration of each of the base stations 200 and 300 will be described in detail with reference to FIG. 4.

FIGS. 1 and 2 illustrate an example of the communication system 10 including the two base stations 200 and 300, but the first embodiment of the present technology can also be applied to a communication system including three or more base stations. FIGS. 1 and 2 illustrate an example of the communication system 10 including one wireless communication device 100, but the first embodiment of the present technology can also be applied to a communication system including two or more wireless communication devices.

The communication system 10 may recognize the base station 200 and the base station 300 as transmitters and the wireless communication device 100 as a receiver. Further, the communication system 10 may recognize the base station 200 and the base station 300 as receivers and the wireless communication device 100 as a transmitter.

[Exemplary Configuration of Wireless Communication Device]

Figure 3:
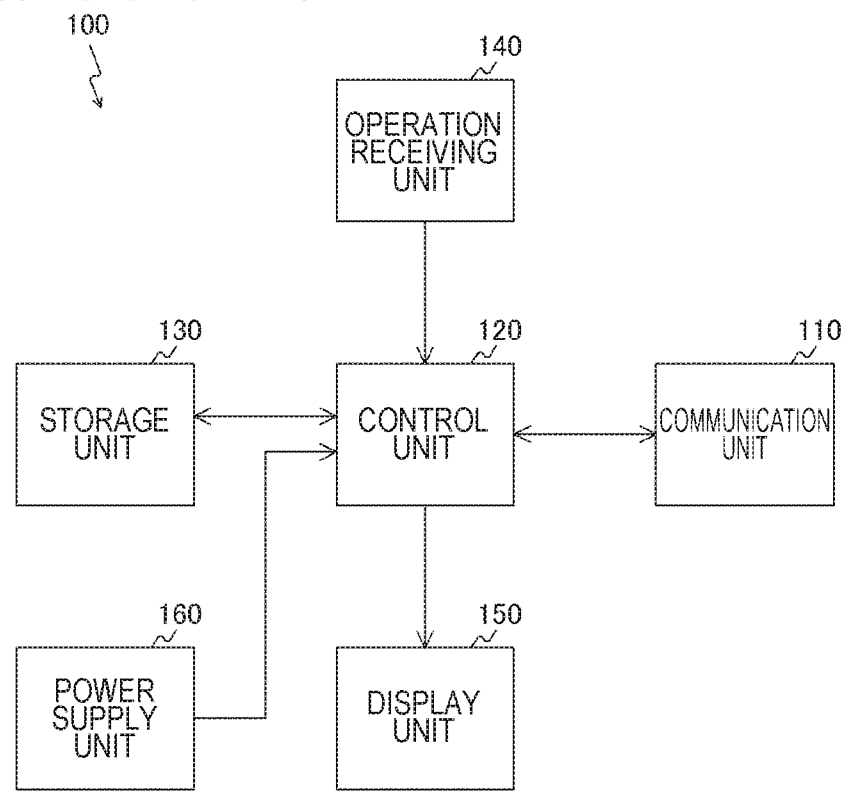
FIG. 3 is a block diagram illustrating an exemplary functional configuration of a wireless communication device 100 according to a first embodiment of the present technology.

FIG. 3 is a block diagram illustrating an exemplary functional configuration of the wireless communication device 100 according to the first embodiment of the present technology.

The wireless communication device 100 includes a communication unit 110, a control unit 120, a storage unit 130, an operation receiving unit 140, a display unit 150, and a power supply unit 160.

The communication unit 110 is a module for transmitting and receiving radio waves via an antenna (not illustrated) (for example, a wireless local area network (LAN) modem). For example, the communication unit 110 can perform wireless communication in accordance with a communication scheme of the wireless LAN.

For example, the communication unit 110 may perform wireless communication in accordance with a communication scheme conforming to institute of electrical and electronics engineers (IEEE) 802.11, IEEE 802.15, IEEE 802.16, or a 3rd generation partnership project (3GPP) specification (for example, wideband code division multiple access (W-CDMA), global system for mobile communications (GSM (registered trademark)), worldwide interoperability for microwave access (WiMAX), WiMAX2, long term evolution (LTE), LTE-advanced (LTE-A)). Further, for example, the communication unit 110 may perform wireless communication in accordance with a communication scheme such as another public network (a mobile network), Bluetooth (registered trademark), ZigBee (registered trademark), BLE, ANT (a protocol of ultra low power consumption type short range network with a 2.4 GHz band).

The communication unit 110 can exchange various kinds of information using a wireless communication function. For example, wireless communication can be performed between devices using the wireless LAN. As the wireless LAN, for example, wireless fidelity (Wi-Fi) direct, tunneled direct link setup (TDLS), an ad hoc network, or a mesh network can be used.

The control unit 120 controls the respective units of the wireless communication device 100 on the basis of a control program stored in the storage unit 130. The control unit 120 is implemented by, for example, a central processing unit (CPU). Further, for example, the control unit 120 performs signal processing on transmitted or received information.

Further, for example, when a signal is transmitted to the base stations 200 and 300 using the wireless communication, the control unit 120 can designate a decision method related to transmission of a response signal (ACK) in response to the signal. For example, the control unit 120 can designate a decision method of deciding whether the base stations 200 and 300 transmit the response signal (ACK) to the wireless communication device 100. Further, for example, the control unit 120 can designate a decision method of deciding a transmission timing of the response signal (ACK). The designation of the decision methods will be described in detail in a fourth embodiment of the present technology.

The storage unit 130 is a memory that stores various kinds of information. For example, the storage unit 130 stores various kinds of information (for example, a control program) necessary for the wireless communication device 100 to perform a desired operation.

The operation receiving unit 140 is an operation receiving unit that receives an operation input performed by the user, and outputs operation information corresponding to the received operation input to the control unit 120. The operation receiving unit 140 is implemented by, for example, a touch panel, a keyboard, a mouse, and a sensor (for example, a touch interface).

The display unit 150 is a display unit that outputs various kinds of information under the control of the control unit 120. As the display unit 150, for example, a display panel such as an organic electro luminescence (EL) panel or a liquid crystal display (LCD) panel can be used. The operation receiving unit 140 and the display unit 150 can be integrally configured using a touch panel that allows the user to input an operation by bringing a finger into contact with or close to a display surface.

The power supply unit 160 supplies power to the respective units of the wireless communication device 100 under the control of the control unit 120. The power supply unit 160 is, for example, an internal battery installed in the wireless communication device 100 or a battery removably attached to the wireless communication device 100. Further, the control unit 120 has a function of estimating the battery remaining level and can acquire an estimated battery remaining level as necessary.

[Exemplary Configuration of Base Station]

Figure 4:
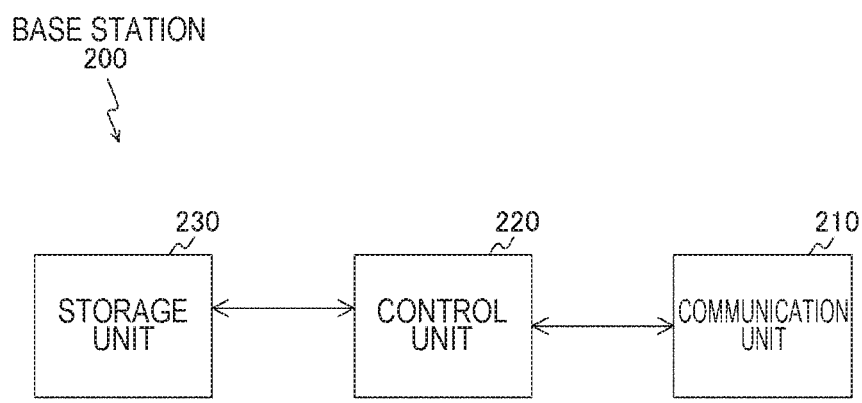
FIG. 4 is a block diagram illustrating an exemplary functional configuration of a base station 200 according to the first embodiment of the present technology.

FIG. 4 is a block diagram illustrating an exemplary functional configuration of the base station 200 according to the first embodiment of the present technology. Since the functional configuration of the base station 300 is the same as that of the base station 200, only the base station 200 will be described here, and description of the base station 300 will be omitted.

The base station 200 includes a communication unit 210, a control unit 220, and a storage unit 230.

The communication unit 210 transmits and receives radio waves via an antenna (not illustrated). For example, the communication unit 210 performs wireless communication in accordance with a communication scheme corresponding to the wireless communication device 100 (for example, a wireless LAN).

For example, as described above, the communication unit 210 can perform wireless communication in accordance with a communication scheme conforming to IEEE 802.11, IEEE 802.15, IEEE 802.16, or the 3GPP specification. The communication unit 210 can exchange various kinds of information using the wireless communication function.

The control unit 220 controls the respective units of the base station 200 on the basis of a control program stored in the storage unit 230. The control unit 220 is implemented by, for example, a CPU. Further, for example, the control unit 220 performs signal processing on transmitted or received information.

Further, for example, when a signal is received from the wireless communication device 100 using wireless communication, the control unit 220 autonomously controls transmission of the response signal (ACK) to the wireless communication device 100 in response to the signal.

The storage unit 230 is a memory that stores various kinds of information. For example, the storage unit 230 stores various kinds of information (for example, a control program) necessary for the base station 200 to perform a desired operation.

[Exemplary Configuration of Data Frame]

Figure 5:
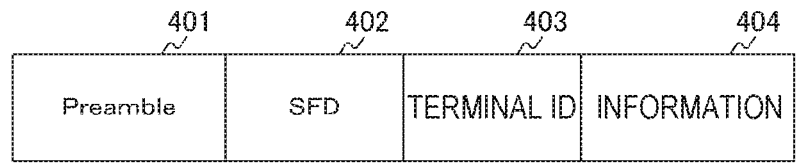
FIG. 5 is a diagram illustrating an exemplary configuration of a data frame when the wireless communication device 100 according to the first embodiment of the present technology performs data transmission.

FIG. 5 is a diagram illustrating an exemplary configuration of a data frame when the wireless communication device 100 according to the first embodiment of the present technology performs data transmission. FIG. 5 illustrates an exemplary configuration of a data frame when the wireless LAN is used as a communication scheme.

The data frame is configured with, for example, a preamble 401, a sync frame detection (SFD) 402, a terminal identification (ID) 403, and information 404.

The preamble 401 is a known pattern used for a reception side device (for example, the base station) detects a radio signal. For example, the reception side device can calculate a correlation between a known pattern and a received signal and detect the presence or absence of the radio signal.

The SFD 402 is a known pattern indicating discontinuity of a data frame. For example, the reception side device can calculate a correlation with a known pattern and detect the discontinuity of the data frame. The reception side device can interpret a meaning of subsequent data by detecting the discontinuity of the data frame.

The terminal ID 403 is an ID specific to the wireless communication device 100 that transmits the data frame. As the terminal ID 403, for example, a media access control (MAC) address can be used. Further, other terminal identification information may be used as the terminal ID 403.

The information 404 is data to be transmitted from the wireless communication device 100 to the base station. For example, data (for example, sensor data) acquired by the wireless communication device 100 is transmitted to the base station as the information 404.

Here, an example in which data communication is performed between the wireless communication device and the base station will be described.

For example, in IEEE 802.11 (for example, the wireless LAN), when data communication is performed between the wireless communication device and the base station, a procedure called the association is performed before the data communication is performed. When the association is performed, the wireless communication device and the base station are associated in a one-to-one manner.

For example, data transmitted by the wireless communication device may be received by a plurality of base stations. However, since the wireless communication device and the base station are associated in a one-to-one manner, the base station can decide whether an ACK response is transmitted on the basis of the association relation. Thus, it is possible to prevent interference caused by ACK transmission performed by a plurality of base stations.

Further, since the association procedure is necessary in terms of the power consumption of the wireless communication device, extra power is consumed. For example, the wireless communication device is assumed to move. For example, when the wireless communication device moves beyond a wireless transmission range of the base station, it is necessary to perform the association with another base station again. In this case, further electric power is consumed.

Here, in a wireless sensor network or the like, the wireless communication devices are required to be reduced in a size and driven for long periods of time. For example, in general, since portable wireless communication devices operate with limited batteries, it is important to reduce power consumption of wireless communication devices. In this regard, the power consumption of the wireless communication devices can be considered to be reduced when the procedure such as the association is omitted.

However, in a wireless system in which data transmission is performed while omitting the association, a transmission signal from a wireless communication device may be received by a plurality of base stations. In this case, when each base station transmits a reception response (ACK) on the basis of a reception result, a plurality of base stations are likely to transmit an ACK. For this reason, interference may occur when the wireless communication device receives the ACKs.

In this regard, in the embodiment of the present technology, an example of reducing interference caused by ACKs when the wireless communication device receives ACKs will be described.

[Exemplary Communication Between Wireless Communication Device and Base Station]

Figure 6:
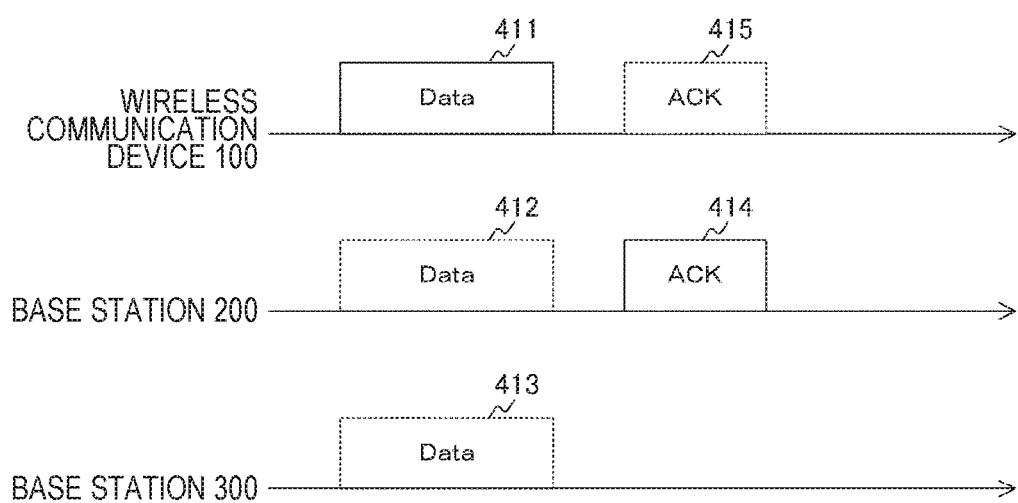
FIG. 6 is a diagram illustrating a relationship between devices constituting the communication system 10 according to the first embodiment of the present technology and information chronologically transmitted or received to or from the devices.

FIG. 6 is a diagram illustrating a relationship between the devices constituting the communication system 10 according to the first embodiment of the present technology and information chronologically transmitted and received between the devices. In FIG. 6, a horizontal axis indicates a time axis. Further, data transmitted by each device is schematically indicated by a solid rectangle on the time axis, and data received by each device is schematically indicated by a dotted rectangle on the time axis.

For example, the wireless communication device 100 is assumed to perform data transmission (411). In this case, the data frame (411) transmitted from the wireless communication device 100 is received by the base station 200 and the base station 300 (412 and 413).

As described above, each of the base station 200 and the base station 300 that have received the data frame (411) transmitted from the wireless communication device 100 decides whether to ACK is transmitted in response to the data frame. In other words, it is decided whether ACK transmission is performed for each base station. The decision method will be described in detail with reference to FIG. 7.

FIG. 6 illustrates an example in which the base station 200 decides to transmit ACK, and the base station 300 decides not to transmit ACK. In this case, the base station 200 transmits ACK in response to the data frame (411) transmitted from the wireless communication device 100 (414 and 415). However, the base station 300 does not transmit ACK in response to the data frame (411) transmitted from the wireless communication device 100.

As described above, when ACK is transmitted from the base station 200, the wireless communication device 100 receives the ACK (415). As a result, the wireless communication device 100 can obtain a reception response to the transmitted data frame (415).

[Exemplary Operation of Base Station]

Figure 7:
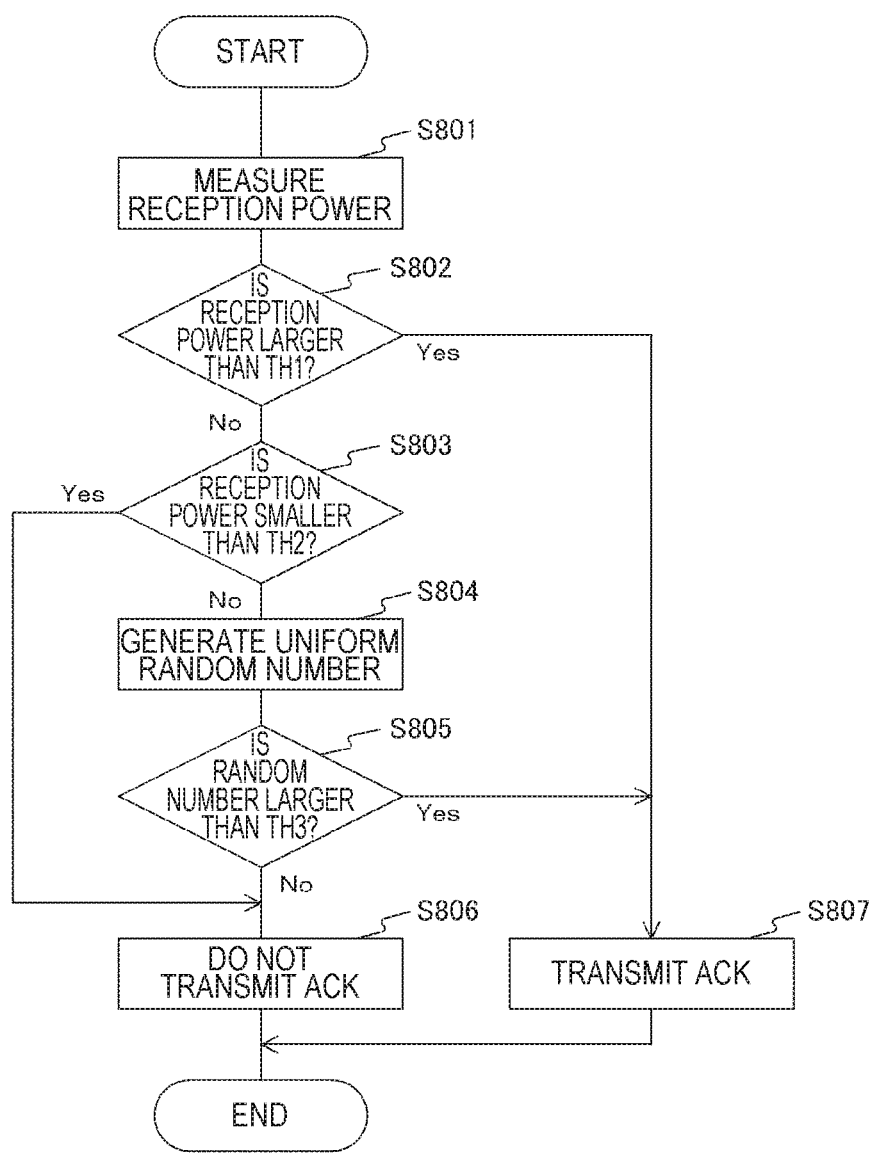
FIG. 7 is a flowchart illustrating an example of a processing procedure of a communication process performed by the base station 200 according to the first embodiment of the present technology.

FIG. 7 is a flowchart illustrating an example of a processing procedure of a communication process performed by the base station 200 according to the first embodiment of the present technology. FIG. 7 illustrates an exemplary operation when the base station 200 receives the data frame transmitted from the wireless communication device 100. Since an exemplary operation of the base station 300 is the same as that of the base station 200, only the base station 200 will be described here, and description of the base station 300 is omitted.

First, the control unit 220 of the base station 200 measures reception power (received signal strength) of the received data frame (step S801). The reception power is an example of a received signal strength set forth in claims.

Here, the reception power has a value that differs depending on a propagation situation between the wireless communication device that has transmitted the data frame and the base station. For example, the reception power generally has a value corresponding to a distance between the wireless communication device that has transmitted the data frame and the base station. For example, when the distance between the wireless communication device and the base station is small, the reception power has a large value. On the other hand, when the distance between the wireless communication device and the base station is large, the reception power has a small value. However, the reception power may be increased or decreased due to influence of a reflector located around the wireless communication device that has transmitted the data frame, an object located between the wireless communication device and the base station, or the like Further, even when the wireless communication device that has transmitted the data frame is moving, the reception power may be increased or decreased due to influence of a reflector located around the wireless communication device or the like.

For example, a received signal strength indicator (RSSI), a signal to interference and noise power ratio (SINR), or a signal to noise ratio (SNR) can be used as the reception power.

Then, the control unit 220 compares the measured reception power with a threshold value TH1, and determines whether the reception power is larger than the threshold value TH1 (step S802). When the reception power is larger than the threshold value TH1 (step S802), the control unit 220 decides to transmit ACK in response to the received data frame (step S807).

On the other hand, when the reception power is the threshold value TH1 or less (step S802), the control unit 220 compares the reception power with a threshold value TH2 (TH2<TH1), and determines whether the reception power is smaller than the threshold value TH2 (step S803). When the reception power is smaller than the threshold value TH2 (step S803), the control unit 220 decides not to transmit ACK in response to the received data frame (step S806).

When the reception power is the threshold value TH2 or more (that is, when the reception power is the threshold value TH1 or less and the threshold value TH2) or more (step S803), the control unit 220 randomly decides whether ACK transmission is performed (steps S804 to S807).

For example, the control unit 220 generates a uniform random number having a range of 0 to 1 (step S804). Then, the control unit 220 compares the generated uniform random number (0 to 1) with a threshold value TH3 (0<TH3<1), and determines whether the uniform random number (0 to 1) is larger than the threshold value TH3 (step S805). When the uniform random number (0 to 1) is larger than the threshold value TH3 (step S805), the control unit 220 decides to transmit ACK in response to the received data frame (step S807).

Further, when the uniform random number (0 to 1) is the threshold value TH3 or less (step S805), the control unit 220 decides not to transmit ACK in response to the received data frame (step S806). Further, steps S801 to S807 are examples of a control procedure set forth in claims.

Here, the threshold value TH1 and the threshold value TH2 are values in which TH2<TH1 is held. For example, the threshold value TH1 and the threshold value TH2 may be set on the basis of an estimation error of the reception power of the base station 200. For example, when the estimation error of the reception power of the base station 200 is 10 dB, a difference between the threshold value TH1 and the threshold value TH2 may be set to 10 dB.

Further, the threshold value TH1 and the threshold value TH2 may be set, for example, in accordance with an environment in which the base station 200 is installed. For example, when urban areas are compared with rural areas, an attenuation rate of radio waves is assumed to be different. For example, in the urban areas, the attenuation rate of radio waves is estimated to be high because there are many cases in which visibility is bad due to buildings r the like. On the other hand, in the rural areas, the attenuation rate of radio waves is estimated to be low because visibility is good due to the absence of buildings and the like. In this regard, threshold value TH1 and threshold value TH2 may be set in view of the attenuation rate of the radio waves. In other words, the threshold value TH1 and the threshold value TH2 may be set on the basis of position information related to the base station 200.

The threshold value TH3 is a value having a range of 0 to 1. The threshold value TH3 may be decided, for example, depending on the number of base stations located around the base station 200 (for example, the number of base stations located within the coverage area of the base station 200). For example, the threshold value TH3 may be obtained by TH3=1−1/N (N is the number of base stations located around the base station 200 (including the base station 200)).

Here, an operation of whether ACK is transmitted will be described with reference to the example illustrated in FIG. 2. For example, when the wireless communication device 100 is located at the position illustrated in FIG. 2, since the wireless communication device 100 is close to the base station 300, the reception power to be measured by the base station 300 (the reception power of the data frame transmitted from the wireless communication device 100) is assumed to increase. Therefore, the reception power is assumed to exceed the threshold value TH1. As described above, when the reception power to be measured by the base station 300 (the reception power of the data frame transmitted from the wireless communication device 100) exceeds the threshold value TH1, the base station 300 transmits ACK in response to the data frame transmitted from the wireless communication device 100.

In the example illustrated in FIG. 2, the reception power to be measured by the base station 200 (the reception power of the data frame transmitted from the wireless communication device 100) is assumed to have a small value since the distance between the base station 200 and the wireless communication device 100 is large. Therefore, the reception power is assumed to be smaller than the threshold value TH2. As described above, when the reception power to be measured by the base station 200 (the reception power of the data frame transmitted from the wireless communication device 100) is smaller than the threshold value TH2, the base station 200 does not transmit ACK in response to the data frame transmitted from the wireless communication device 100.

As described above, since it is determined whether ACK is transmitted in response to the data frame transmitted from the wireless communication device 100, it is possible to reduce interference of ACKs transmitted from the base station 200 and the base station 300.

An operation of determining whether ACK transmission is performed will be described with reference to the example illustrated in FIG. 1. For example, when the wireless communication device 100 is located at the position illustrated in FIG. 1, the distance between the wireless communication device 100 and the base station 200 is substantially the same as the distance between the wireless communication device 100 and the base station 300. Therefore, the reception power to be measured by the base station 200 is assumed to be substantially the same as the reception power to be measured by the base station 300. Further, the reception power to be measured by the base station 200 and the reception power to be measured by the base station 300 may have a value between the threshold value TH1 and the threshold value TH2. In this case, each of the base station 200 and the base station 300 randomly decides whether ACK is transmitted in response to the data frame transmitted from the wireless communication device 100.

For example, when there are two base stations therearound as illustrated in FIG. 1, the threshold value TH3 can be set to 0.5 (½). In this case, it is stochastically possible to cause one of the base station 200 and the base station 300 to decide whether ACK is transmitted stochastically.

As described above, when a signal is received from the wireless communication device 100 using the wireless communication, the control unit 220 of the base station 200 can autonomously control the transmission of the response signal (ACK) to the wireless communication device 100 in response to the signal. For example, the control unit 220 can decide whether the response signal is transmitted to the wireless communication device 100 on the basis of the received signal strength (reception power) of the signal. Further, for example, the control unit 220 can randomly decide whether the response signal is transmitted to the wireless communication device 100. In this case, when the received signal strength of the signal is within a predetermined range (for example, within the range between the threshold value TH1 and the threshold value TH2), the control unit 220 can randomly decide whether the response signal is transmitted to the wireless communication device 100.

2. Second Embodiment

In the first embodiment of the present technology, the example of deciding whether ACK is transmitted for each base station has been described. In a second embodiment of the present technology, an example of deciding a timing to transmit ACK for each base station will be described.

Configurations of devices according to the second embodiment of the present technology are substantially the same as the wireless communication device 100 and the base stations 200 and 300 illustrated in FIG. 1 and the like. For this reason, the same parts as those of the first embodiment of the present technology are denoted by the same reference numerals as those of the first embodiment of the present technology, and a part of description thereof will be omitted.

[Exemplary Communication Between Wireless Communication Device and Base Station]

Figure 8:
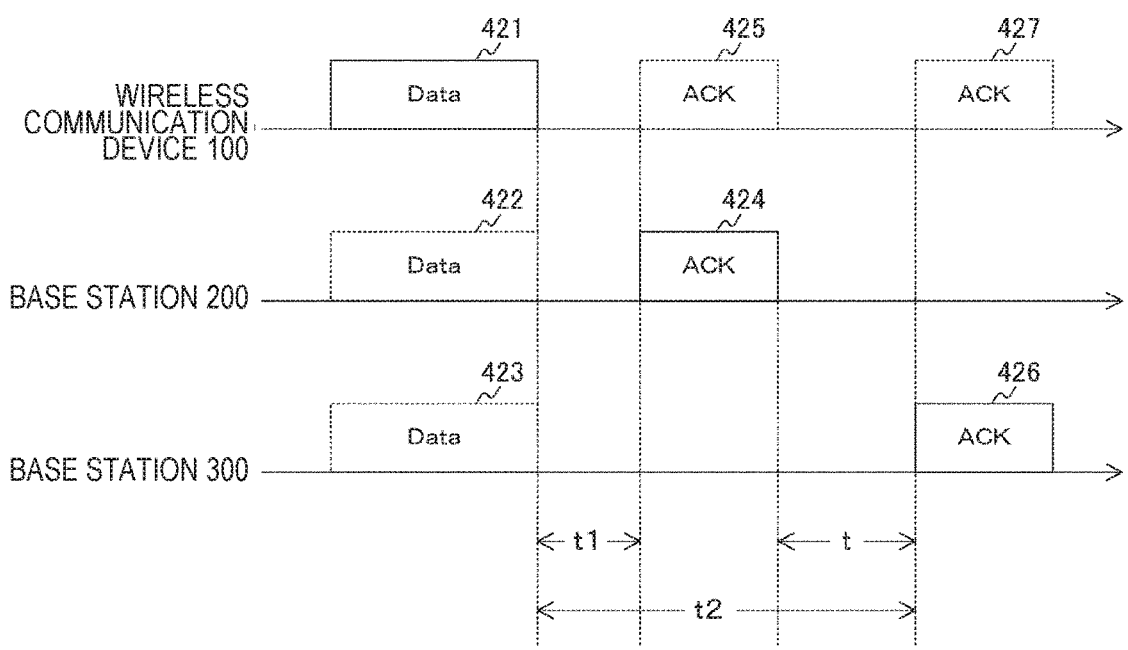
FIG. 8 is a diagram illustrating a relationship between devices constituting a communication system 10 according to a second embodiment of the present technology and information chronologically transmitted or received to or from the devices.

FIG. 8 is a diagram illustrating a relationship between the devices constituting the communication system 10 according to the second embodiment of the present technology and information chronologically transmitted and received between each device. In FIG. 8, a horizontal axis represents a time axis. Further, data transmitted by each device is schematically indicated by a solid rectangle on the time axis, and data received by each device is schematically indicated by a dotted rectangle on the time axis.

For example, the wireless communication device 100 is assumed to perform data transmission (421). In this case, the data frame (421) transmitted from the wireless communication device 100 is received by the base station 200 and the base station 300 (422, 423).

In this way, each of the base station 200 and the base station 300 that have received the data frame (421) transmitted from the wireless communication device 100 decides a timing to transmit ACK in response to the data frame for each base station. A method of deciding the ACK transmission timing will be described in detail with reference to FIGS. 9 to 11.

As described above, each of the base station 200 and the base station 300 decides the timing to transmit ACK in response to the data frame. FIG. 8 illustrates an example in which the base station 200 decides to transmit ACK after t1 elapses after the reception of the data frame, and the base station 300 decides to transmit ACK after t2 elapses after the reception of the data frame. In this case, the base station 200 transmits ACK in response to the data frame (421) transmitted from the wireless communication device 100 after t1 elapses after the reception of the data frame (424, 425). Further, the base station 300 transmits ACK in response to the data frame (421) transmitted from the wireless communication device 100 after t2 elapses after the reception of the data frame (426, 427).

As described above, when ACK is transmitted from both the base station 200 and the base station 300, the wireless communication device 100 receives ACKs (425 and 427). Thus, the wireless communication device 100 can obtain the reception response with respect to the transmitted data frame from both of the base stations (425 and 427).

Here, the interval t1 may be set to a value smaller than the interval t2. Further, the interval t2 may be set to a value larger than a value obtained by adding the ACK transmission time and the interval t1. In other words, the interval t2 may be set to a value larger than "interval t1+ACK transmission time."

For example, the interval t2 may be "interval t1+ACK transmission time+t (here, t>0)."

[Exemplary Operation of Base Station]

Figure 9:
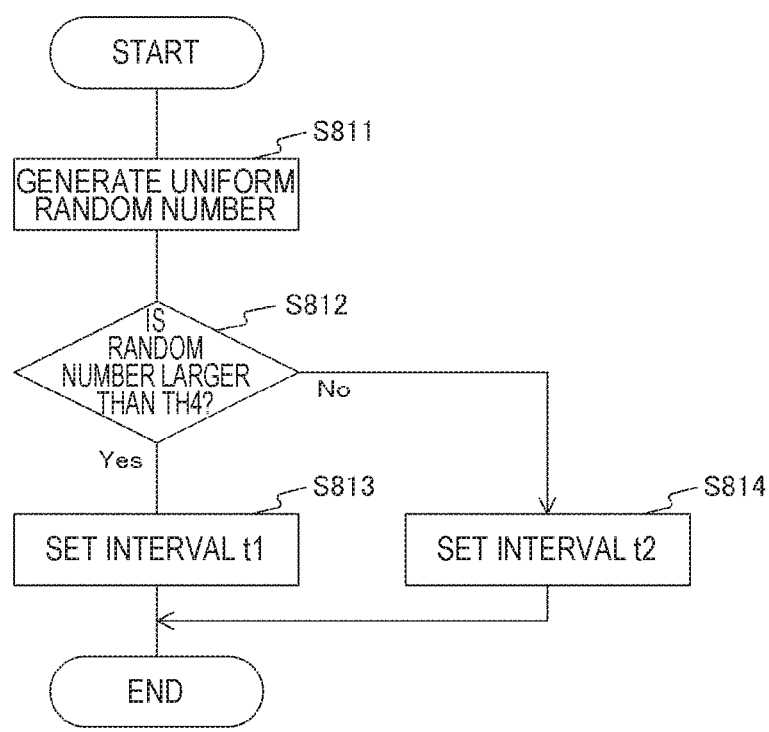
FIG. 9 is a flowchart illustrating an example of a processing procedure of a communication process performed by a base station 200 according to the second embodiment of the present technology.

FIG. 9 is a flowchart illustrating an example of processing procedure of a communication process performed by the base station 200 according to the second embodiment of the present technology. FIG. 9 illustrates an exemplary operation when the base station 200 receives the data frame transmitted from the wireless communication device. Further, FIG. 9 illustrates an example of randomly deciding a timing to transmit ACK in response to the received data frame. Further, FIG. 9 illustrates an example in which there are two base stations around the base station 200. Since the exemplary operation of the base station 300 is the same as that of the base station 200, only the base station 200 will be described here, and description of the base station 300 will be omitted.

First, the control unit 220 of the base station 200 generates a uniform random number having a range of 0 to 1 (step S811). Then, the control unit 220 compares the generated uniform random number (0 to 1) with a threshold value TH4 and determines whether the uniform random number (0 to 1) is larger than the threshold value TH4 (step S812).

When the uniform random number (0 to 1) is larger than the threshold value TH4 (step S812), the control unit 220 decides an interval t1 as the timing to transmit ACK in response to the received data frame (step S813).

Further, when the uniform random number (0 to 1) is the threshold value TH4 or less (step S812), the control unit 220 decides an interval t2 as the timing to transmit ACK in response to the received data frame (step S814).

Here, for example, the threshold value TH4 may be set on the basis of an environment in which the base station 200 is installed. For example, the threshold value TH4 may be set on the basis of the number of base stations installed around the base station 200. For example, the threshold value TH4 may be obtained by "TH4=1−1/N" (N is the number of base stations installed around the base station 200).

As described above, the timings at which the base station 200 and the base station 300 transmit ACK can be stochastically divided into the interval t1 and the interval t2. Thus, the possibility of interference of ACK can be reduced.

As described above, the control unit 220 of the base station 200 can randomly decide the timing to transmit the response signal (ACK) to the wireless communication device 100.

[Exemplary Operation of Base Station]

FIG. 9 illustrates an example in which there are two base stations installed around the base station 200. However, the second embodiment of the present technology can also be applied to when the number of base stations installed around the base station 200 is three or more. In this regard, an exemplary operation when there are three or more base stations installed around the base station 200 will be described with reference to FIG. 10.

Figure 10:
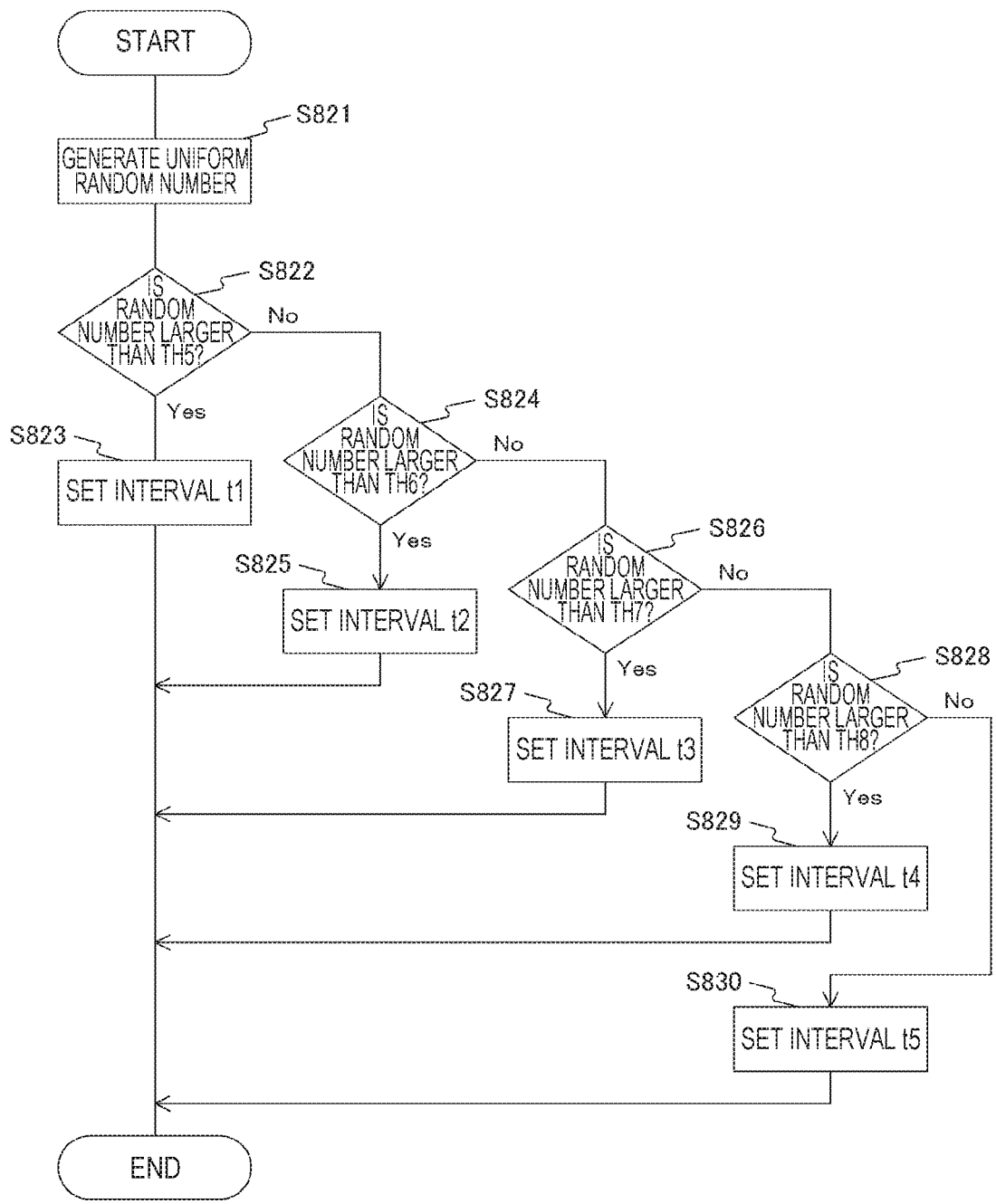
FIG. 10 is a flowchart illustrating an example of a processing procedure of a communication process performed by a base station 200 according to the second embodiment of the present technology.

FIG. 10 is a flowchart illustrating an example of a processing procedure of a communication process performed by the base station 200 according to the second embodiment of the present technology. FIG. 10 illustrates an example in which there are five base stations installed around the base station 200. FIG. 10 is a modified example of the exemplary operation illustrated in FIG. 9, and thus description of the same parts as those of FIG. 9 will be omitted.

A process (steps S821 to S823) illustrated in FIG. 10 corresponds to the process (steps S811 to S813) illustrated in FIG. 9. Further, a process (steps S824 to S830) illustrated in FIG. 10 corresponds to the process (steps S812 to S814) illustrated in FIG. 9.

Here, threshold values TH5 to TH8 and intervals t1 to t5 will be described.

For example, the threshold values TH5 to TH8 may be set on the basis of an environment in which the base station 200 is installed. For example, the threshold values TH5 to TH8 may be set on the basis of the number of base stations installed around the base station 200. For example, the threshold value TH5 may be obtained by "TH5=1−1/N."

Further, for example, the threshold value TH6 may be obtained by "TH6=1−2/N."

Further, for example, the threshold value TH7 may be obtained by "TH7=1−3/N."

Further, for example, the threshold value TH8 may be obtained by "TH8=1−4/N."

N is the number of base stations installed around the base station 200.

Further, the interval t1 and the interval t2 may be set to values similar to those in the example illustrated in FIG. 9. Further, intervals t3 to t5 may be calculated similarly to the interval t2. For example, the interval t3 may be set to a value larger than "interval t2+ACK transmission time."

For example, the interval t3 may be "interval t2+ACK transmission time+t (here, t>0)."

The intervals t1 to t5 may be appropriately set on the basis of a predetermined rule (for example, a simple increase or a simple decrease).

[Exemplary Operation of Base Station]

FIGS. 9 and 10 illustrate an example in which the timing to transmit ACK with respect to the received data frame is randomly decided. However, the timing to transmit ACK may be randomly decided in view of the reception power of the data frame. This example is illustrated in FIG. 11.

Figure 11:
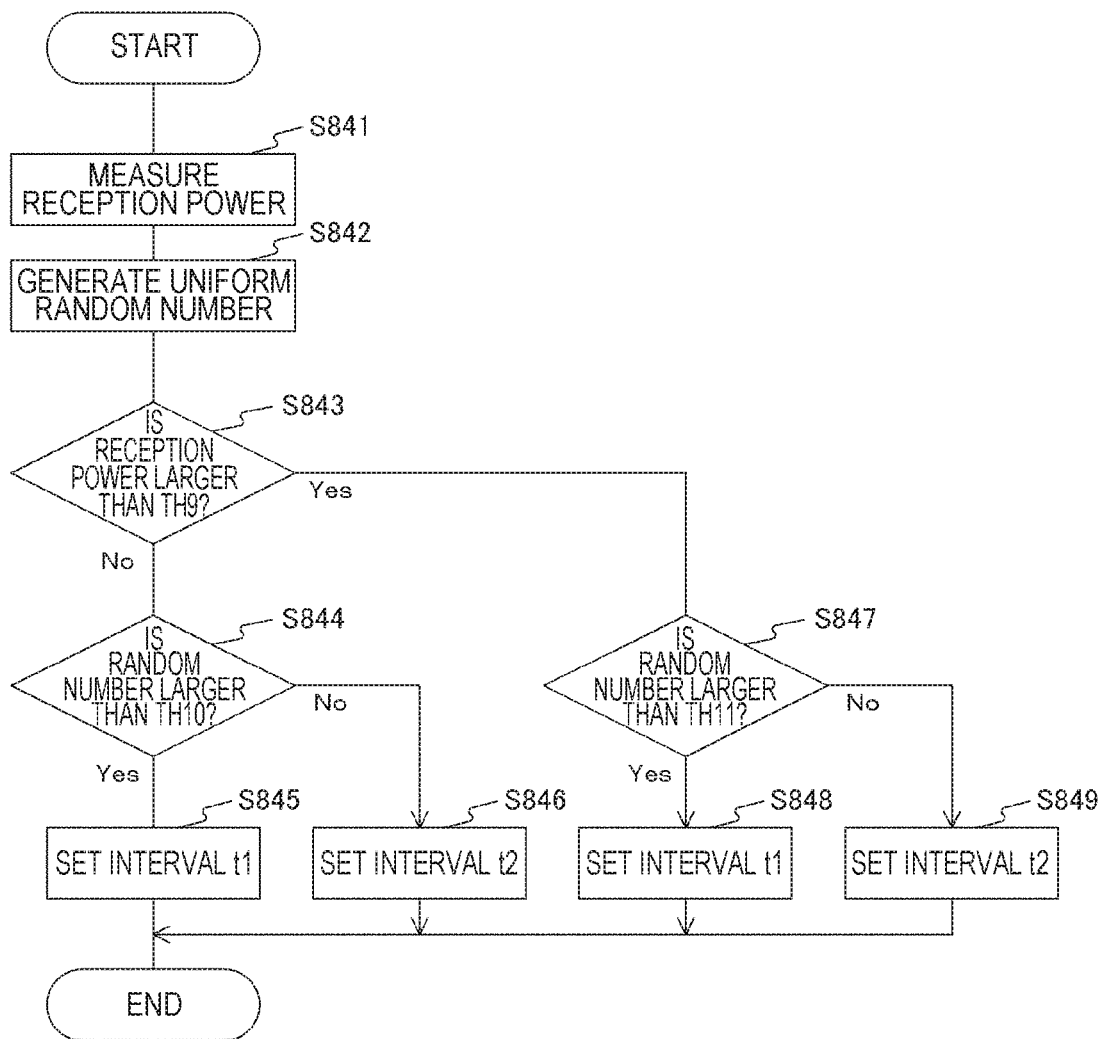
FIG. 11 is a flowchart illustrating an example of a processing procedure of a communication process performed by a base station 200 according to the second embodiment of the present technology.

FIG. 11 is a flowchart illustrating an example of a processing procedure of a communication process performed by the base station 200 according to the second embodiment of the present technology. FIG. 11 illustrates an exemplary operation in which the base station 200 receives the data frame transmitted from the wireless communication device. Further, FIG. 11 illustrates an example in which the timing to transmit ACK with respect to the received data frame is randomly decided in view of the reception power of the data frame. Further, FIG. 11 illustrates an example in which there are two base stations installed around the base station 200. Since the exemplary operation of the base station 300 is the same as that of the base station 200, only the base station 200 will be described here, and description of the base station 300 will be omitted.

First, the control unit 220 of the base station 200 measures the reception power of the received data frame (step S841). Then, the control unit 220 of the base station 200 generates the uniform random numbers having the range of 0 to 1 (step S842).

Then, the control unit 220 compares the measured reception power with a threshold value TH9, and determines whether the reception power is larger than the threshold value TH9 (step S843). When the reception power is the threshold value TH9 or less (step S843), the process proceeds to step S844. Further, when the reception power is larger than the threshold value TH9 (step S843), the process proceeds to step S847.

A process (steps S844 to S846 and steps S847 to S849) illustrated in FIG. 11 corresponds to the process (steps S812 to S814) illustrated in FIG. 9.

Here, the threshold values TH9 to TH11 will be described.

For example, the threshold values TH9 to TH11 may be set on the basis of an environment in which the base station 200 is installed. For example, the threshold value TH9 can be a reception power value (for example, an average value) when the wireless communication device that transmits the data frame is located at the center between the base station 200 and another base station.

Further, for example, the threshold value TH10 may be set to a value smaller than 1−1/N. Further, for example, the threshold value TH11 may be set to a value larger than 1−1/N. N is the number of base stations installed around the base station 200.

Further, the interval t1 and the interval t2 may be set to values similar to those in the example illustrated in FIG. 9. In the example illustrated in FIG. 11, the interval to be set has two types, that is, the interval t1 and the interval t2, but three or more intervals may be set.

As described above, the timing to transmit ACK with respect to the received data frame can be randomly decided in view of the reception power of the data frame. Thus, it is possible to reduce the interval selected by the base station installed near the wireless communication device which has transmitted the data frame stochastically, and it is possible to increase the interval selected by the base station installed at a position far from the wireless communication device. Further, the reception power when ACK transmitted by the base station installed near the wireless communication device reaches the wireless communication device is assumed to be high. Therefore, there is a high possibility that ACK transmitted by the base station installed near the wireless communication device will be successfully received. Thus, it is possible to reduce the ACK reception time on the wireless communication device side.

3. Third Embodiment

In the first embodiment of the present technology, the example of deciding whether ACK is transmitted for each base station has been described. In the second embodiment of the present technology, the example of deciding the timing to transmit ACK for each base station has been described.

In a third embodiment of the present technology, an example in which the first embodiment of the present technology is combined with the second embodiment of the present technology will be described. In other words, an example in which it is decided whether ACK transmission is performed, and when ACK transmission is decided to be performed, the timing to transmit ACK is decided will be described.

Configurations of devices according to the third embodiment of the present technology are substantially the same as the wireless communication device 100 and the base stations 200 and 300 illustrated in FIG. 1 and the like. For this reason, the same parts as those of the first embodiment of the present technology are denoted by the same reference numerals as those of the first embodiment of the present technology, and a part of description thereof will be omitted.

[Exemplary Operation of Base Station]

Figure 12:
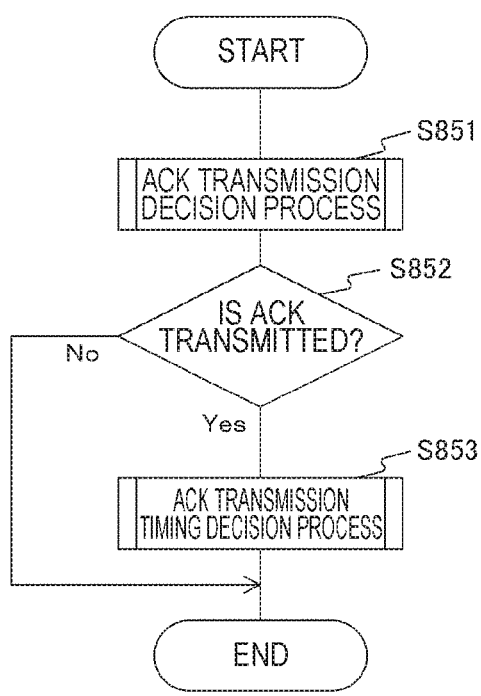
FIG. 12 is a flowchart illustrating an example of a processing procedure of a communication process performed by a base station 200 according to a third embodiment of the present technology.

FIG. 12 is a flowchart illustrating an example of a processing procedure of a communication process performed by the base station 200 according to the third embodiment of the present technology. FIG. 12 illustrates an exemplary operation when the base station 200 receives the data frame transmitted from the wireless communication device. Since the exemplary operation of the base station 300 is the same as that of the base station 200, only the base station 200 will be described here, and description of the base station 300 will be omitted.

First, the control unit 220 of the base station 200 performs an ACK transmission decision process (step S851). The ACK transmission decision process corresponds to the process illustrated in FIG. 7.

Then, the control unit 220 determines whether ACK is transmitted through the ACK transmission decision process (step S852). When ACK is decided not to be transmitted (step S852), the operation of the communication process ends.

When ACK is decided to be transmitted (step S852), the control unit 220 performs an ACK transmission timing decision process (step S853). The ACK transmission timing decision process corresponds to the process illustrated in FIGS. 9 to 11.

As described above, the control unit 220 of the base station 200 may decide whether the response signal is transmitted to the wireless communication device 100 on the basis of the received signal strength (reception power) of the signal. Then, when the response signal is decided to be transmitted to the wireless communication device 100, the control unit 220 may decide the timing to transmit the response signal to the wireless communication device 100 randomly (or in view of the reception power).

4. Fourth Embodiment

In the first to third embodiments of the present technology, the example in which each decision process related to the ACK transmission is performed on the basis of the control of the base station. Here, for example, the decision method related to the ACK transmission is also considered to be designated on the side of the wireless communication device.

In this regard, in a fourth embodiment of the present technology, an example in which the decision method related to the ACK transmission is designated on the side of the wireless communication device will be described.

Configurations of devices according to the fourth embodiment of the present technology are substantially the same as the wireless communication device 100 and the base stations 200 and 300 illustrated in FIG. 1 and the like. For this reason, the same parts as those of the first embodiment of the present technology are denoted by the same reference numerals as those of the first embodiment of the present technology, and a part of description thereof will be omitted.

[Exemplary Configuration of Data Frame]

FIG. 13 is a diagram illustrating an exemplary configuration of a data frame when the wireless communication device 100 according to the fourth embodiment of the present technology performs data transmission. A data frame illustrated in FIG. 13 is a modification of the data frame illustrated in FIG. 5 except that an ACK mode 1 504 and an ACK mode 2 505 are added. In other words, a preamble 501, an SFD 502, a terminal ID 503, and information 506 illustrated in FIG. 13 correspond to the preamble 401, the SFD 402, the terminal ID 403, and the Information 404 illustrated in FIG. 5. Thus, here, description will proceed centering on differences with FIG. 5.

The ACK mode 1 504 is information designating whether an operation of causing the base station to perform the ACK transmission decision process described in the first embodiment of the present technology (for example, the process illustrated in FIG. 7) is performed. For example, one bit may be allocated to the ACK mode 1 504, and "0" or "1" may be allocated to indicate whether the operation of causing the base station to perform the ACK transmission decision process is performed.

For example, when the base station is designated not to perform the ACK transmission decision process, "0" is stored in the ACK mode 1 504. Further, when the base station is designated to perform the ACK transmission decision process, "1" is stored in the ACK mode 1 504.

The ACK mode 2 505 is information designating whether the operation of causing the base station to perform the ACK transmission timing decision process described in the second embodiment of the present technology (for example, the process illustrated in FIGS. 9 to 11) is performed. For example, one bit may be allocated to the ACK mode 2 505, and "0" or "1" may be allocated to indicate whether the operation of causing the base station to perform the ACK transmission timing decision process is performed.

For example, when the base station is designated not to perform the ACK transmission timing decision process, "0" is stored in ACK mode 2 505. Further, when the base station is designated to perform the ACK transmission timing decision process, "1" is stored in ACK mode 2 505.

Further, in order to cause the base station to perform both the ACK transmission decision process and the ACK transmission timing decision process as described in the third embodiment of the present technology, "1" is stored in both of the ACK mode 1 504 and the ACK mode 2 505.

Figure 15:
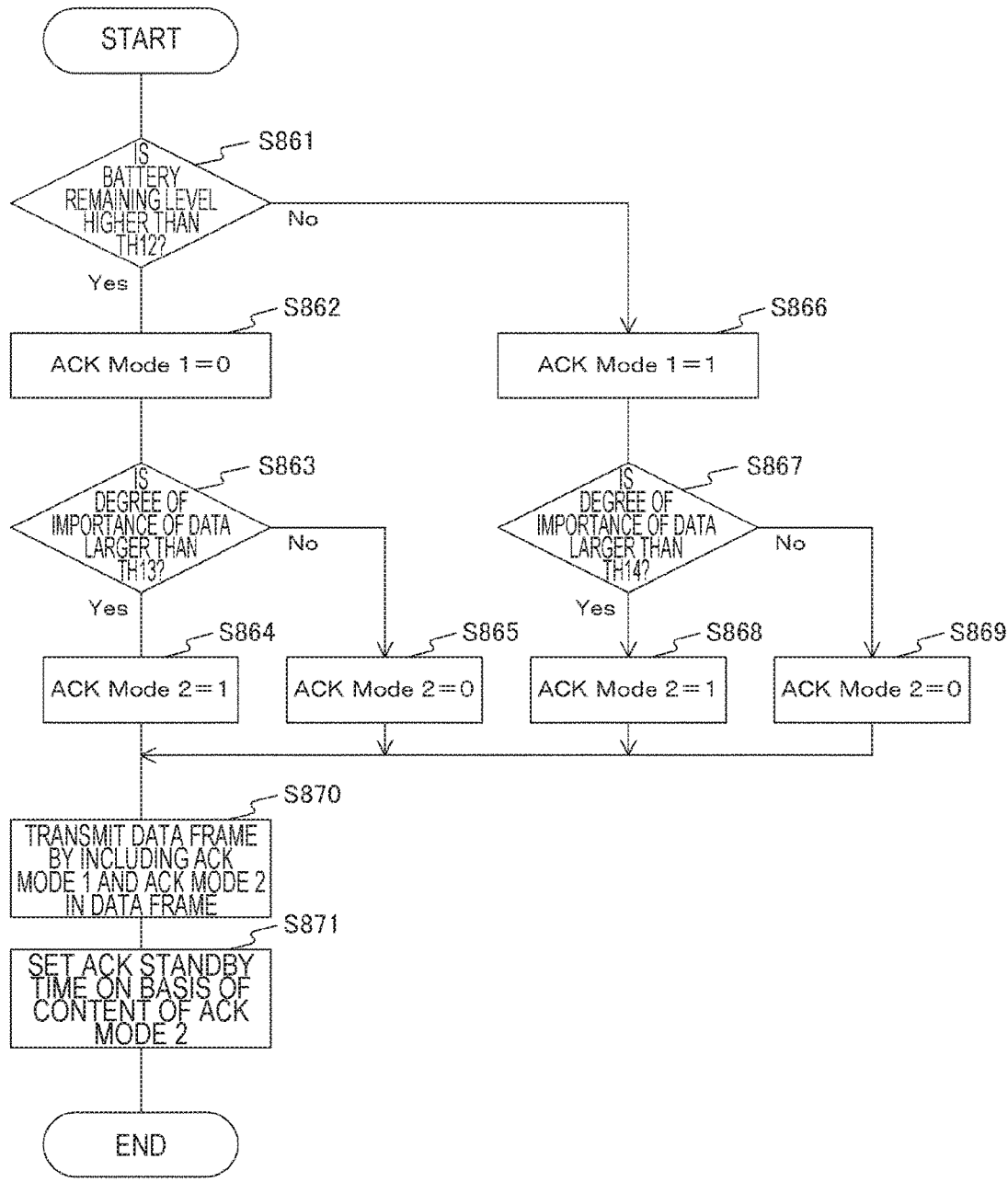
FIG. 15 is a flowchart illustrating an example of a processing procedure of a communication process performed by the wireless communication device 100 according to the fourth embodiment of the present technology.

The designations may be performed manually by the user or may be performed automatically by the wireless communication device 100. Then, when the data frame is transmitted, the wireless communication device 100 includes the ACK mode 1 504 and the ACK mode 2 505 in the data frame, and transmits the resulting data frame. FIG. 15 illustrates an exemplary operation in which the designations are performed automatically by the wireless communication device 100.

For example, when the battery remaining level of the wireless communication device 100 is low, it is desirable to reduce the reception time of the wireless communication device 100. In this regard, in this case, it is possible to cause the base station to perform only the ACK transmission decision process described in the first embodiment of the present technology. As described above, by causing the base station to perform only the ACK transmission decision process described in the first embodiment of the present technology, the wireless communication device 100 only has to be on standby for reception of ACK only for a short time after the data frame is transmitted.

For example, when data with a high degree of importance is communicated, it is desirable to reliably receive ACK. In this regard, in this case, it is possible to cause the base station to perform only the ACK transmission timing decision process described in the second embodiment of the present technology. As described above, by causing the base station to perform only ACK transmission timing decision process, the wireless communication device 100 only has to be on standby for reception of ACK for a relatively long period of time after the data frame is transmitted, but it is possible to wait for reception of ACK from a plurality of base stations. Accordingly, it is possible to increase certainty of data communication.

Further, for example, it is desirable to receive ACK with some degree of certainty, but there is a desire to reduce the reception time as well. In this case, it is possible to cause the base station to perform both the ACK transmission timing decision process described in the second embodiment of the present technology and the ACK transmission decision process described in the first embodiment of the present technology. Accordingly, after the data frame is transmitted, the wireless communication device 100 is on standby for reception of ACK for a relatively long period of time, but it is possible to expect reception of ACK from a plurality of base stations. Moreover, it is possible to increase the certainty of data communication.

[Exemplary Communication]

Figure 14:
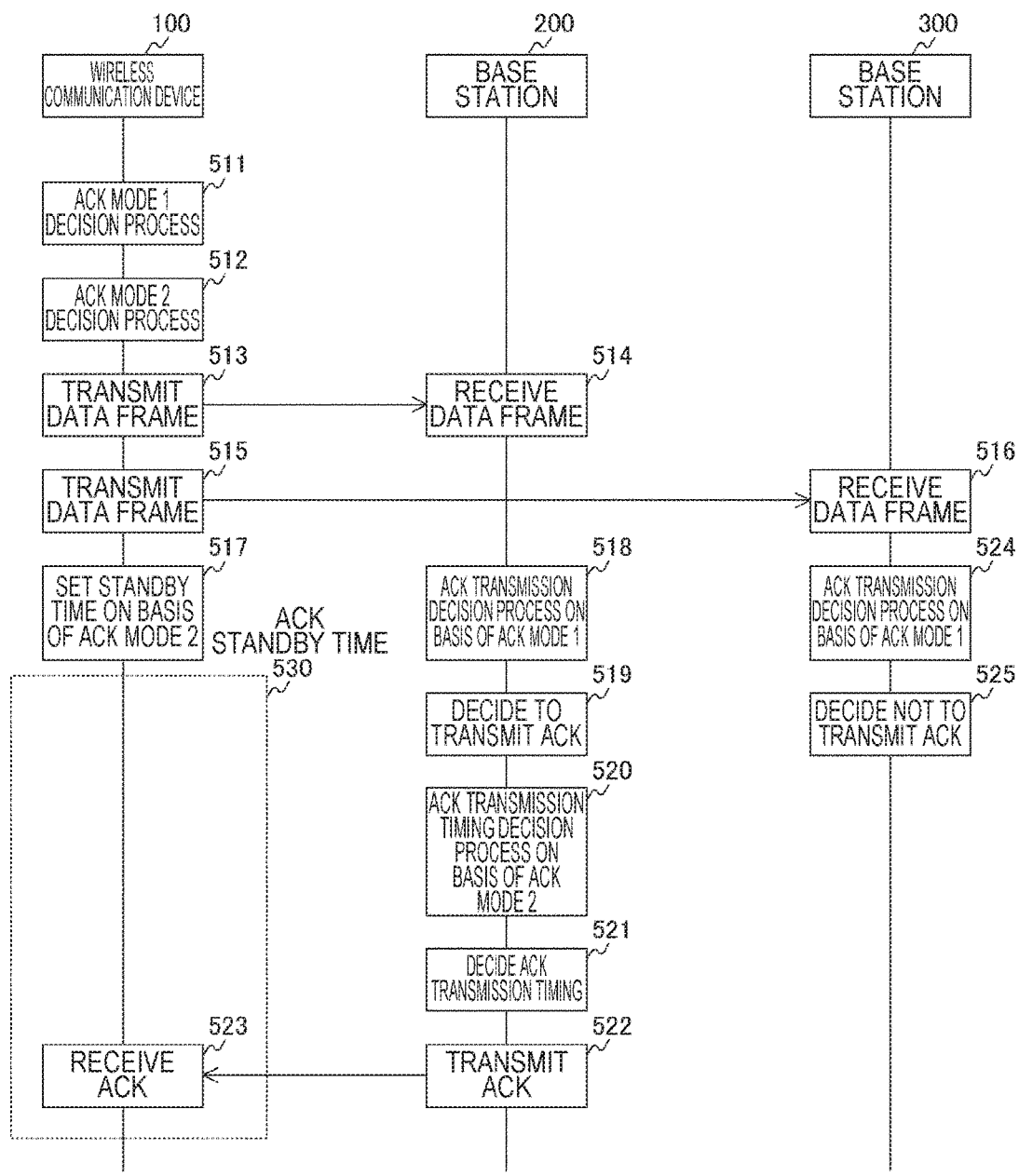
FIG. 14 is a sequence chart illustrating an example of a communication process between devices constituting the communication system 10 according to the fourth embodiment of the present technology.

FIG. 14 is a sequence chart illustrating an example of a communication process between devices constituting the communication system 10 according to the fourth embodiment of the present technology. FIG. 14 illustrates an example in which the base station 200 decides to transmit ACK, and the base station 300 decides not to transmit ACK.

First, the wireless communication device 100 performs a decision process of deciding content of the ACK mode 1 (511). For example, it is possible to decide the content of the ACK mode 1 on the basis of the battery remaining level.

Then, the wireless communication device 100 performs the decision process of deciding content of the ACK mode 2 (512). For example, it is possible to decide the content of the ACK mode 2 on the basis of a degree of importance of the data frame to be transmitted.

Then, the wireless communication device 100 transmits the data frame including the decided content of the ACK mode 1 and the ACK mode 2 (513 to 516).

Then, the wireless communication device 100 sets an ACK standby time 530 on the basis of the decided content of the ACK mode 2 (517).

The base station 200 and the base station 300 that have received the data frame perform the ACK transmission decision process on the basis of the content of the ACK mode 1 included in the received data frame (518 and 524). As described above, the base station 200 decides to transmit ACK (519), and the base station 300 decides not to transmit ACK (525). The base station 300 that has decided not to transmit ACK does not perform a subsequent process.

The base station 200 that has decided to transmit ACK performs the ACK transmission timing decision process on the basis of the content of the ACK mode 2 included in the received data frame (520). Then, the base station 200 decides the ACK transmission timing (521).

Then, the base station 200 transmits ACK to the wireless communication device 100 at the transmission timing decided through the ACK transmission timing decision process (522 and 523). In this case, the wireless communication device 100 can receive ACK from the base station 200 within the ACK standby time 530 set on the basis of the content of the ACK mode 2 included in the transmitted data frame (523).

[Exemplary Operation of Wireless Communication Device]

FIG. 15 is a flowchart illustrating an example of a processing procedure of a communication process performed by the wireless communication device 100 according to the fourth embodiment of the present technology.

First, the control unit 120 of the wireless communication device 100 checks the battery remaining level and determines whether the battery remaining level is higher than a threshold value TH12 (step S861). When the battery remaining level is higher than the threshold value TH12 (step S861), the control unit 120 stores "0" in the ACK mode 1 504 (step S862).

Then, the control unit 120 determines whether the degree of importance of the data frame to be transmitted is larger than a threshold value TH13 (step S863). Here, the degree of importance of the data frame can be decided, for example, in accordance with content of information 506 of the data frame to be transmitted. The degree of importance of the data frame may have, for example, a value of five levels (for example, a minimum value is assumed to be 1, and a maximum value is assumed to be 5). In this case, for example, information with a high degree of importance (for example, 4 or 5 of five steps) is an emergency notification. For example, when the wireless communication device 100 is a watching device, the emergency notification is information related to human life (for example, information for notifying of a heart attack or information for notifying of collapse). Further, information having a low degree of importance (for example, 1 or 2 of five steps) is, for example, regular transmission information. For example, when the wireless communication device 100 is a watching device, the regular transmission information is information related to a temperature, a body temperature, position information, or lighting.

When the degree of importance of the data frame to be transmitted is higher than a threshold value TH13 (step S863), the control unit 120 stores "1" in the ACK mode 2 505 (step S864).

When the degree of importance of the data frame to be transmitted is the threshold value TH13 or less (step S863), the control unit 120 stores "0" in the ACK mode 2 505 (step S865).

When the battery remaining level is lower than the threshold value TH12 (step S861), the control unit 120 stores "1" in the ACK mode 1 504 (step S866).

Then, the control unit 120 determines whether the degree of importance of the data frame to be transmitted is higher than a threshold value TH14 (step S867).

When the degree of importance of the data frame to be transmitted is higher than the threshold value TH14 (step S867), the control unit 120 stores "1" in the ACK mode 2 505 (step S868).

Further, when the degree of importance of the data frame to be transmitted is the threshold value TH14 or less (step S867), the control unit 120 stores "0" in the ACK mode 2 505 (step S869).

Then, the control unit 120 includes the ACK mode 1 504 and the ACK mode 2 505 in the data frame and transmits the resulting data frame (step S870). Steps S861 to S870 are an example of a procedure set forth in claims.

Then, the control unit 120 sets the ACK standby time on the basis of the content of the ACK mode 2 505 (step S871). For example, when "0" is stored in the ACK mode 2 505, a normal standby time (for example, "t1+dt" illustrated in FIG. 8) is set. Further, for example, when "1" is stored in the ACK mode 2 505, a standby time longer than the normal standby time (for example, "t2+dt" illustrated in FIG. 8) is set. Here, dt is a positive value.

As described above, when the signal is transmitted to the base stations 200 and 300 using the wireless communication, the control unit 120 of the wireless communication device 100 can designate the decision method related to the transmission of the response signal (ACK) with respect to the signal. For example, the control unit 120 can designate the decision method of deciding whether the base stations 200 and 300 transmit the response signal (ACK) to the wireless communication device 100. Further, for example, the control unit 120 can designate the decision method of deciding the transmission timing of the response signal (ACK). As described above, when the decision method of deciding the transmission timing is designated, the control unit 120 can set the standby time for the response signal corresponding to the decision method.

Further, the control unit 120 can include the information designating the decision methods (the ACK mode 1 and the ACK mode 2) in the signal and transmit the resulting signal.

As described above, the ACK standby time can be set on the basis of the content of the ACK mode 2 included in the transmitted data frame. In this case, the wireless communication device 100 can receive ACK from the base station within the set ACK standby time.

As described above, the wireless communication device 100 can automatically designate the decision method related to the ACK transmission.

[Exemplary Operation of Base Station]

Figure 16:
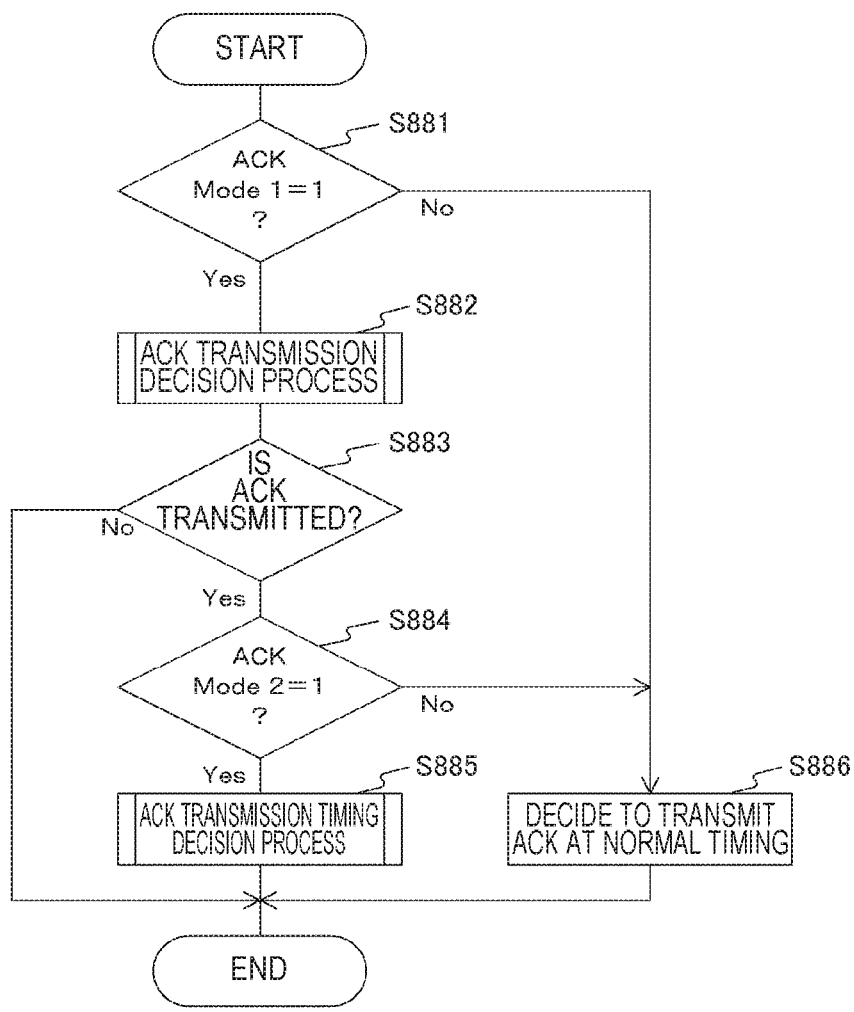
FIG. 16 is a flowchart illustrating an example of a processing procedure of a communication process performed by a base station 200 according to the fourth embodiment of the present technology.

FIG. 16 is a flowchart illustrating an example of a processing procedure of a communication process performed by the base station 200 according to the fourth embodiment of the present technology. FIG. 16 illustrates an exemplary operation in which the base station 200 receives the data frame transmitted from the wireless communication device. Since the exemplary operation of the base station 300 is the same as that of the base station 200, only the base station 200 will be described here, and description of the base station 300 will be omitted.

First, the control unit 220 of the base station 200 determines whether "1" is stored in the ACK mode 1 included in the received data frame (step S881). When "0" is stored in the ACK mode 1 (step S881), the control unit 220 decides to perform the ACK transmission at the normal timing (step S886).

When "1" is stored in the ACK mode 1 (step S881), the control unit 220 performs the ACK transmission decision process (step S882). This ACK transmission decision process corresponds to the process illustrated in FIG. 7.

Then, the control unit 220 determines whether ACK is decided to be transmitted through the ACK transmission decision process (step S883). When ACK is decided not to be transmitted (step S883), the operation of the communication process ends.

When ACK is decided to be transmitted (step S883), the control unit 220 determines whether "1" is stored in the ACK mode 2 included in the received data frame (step S884). When "0" is stored in the ACK mode 2 (step S884), the control unit 220 decides to transmit ACK at the normal timing (step S886).

When "1" is stored in the ACK mode 2 (step S884), the ACK transmission timing decision process is performed (step S885). This ACK transmission timing decision process corresponds to the process illustrated in FIGS. 9 to 11.

Thus, in the embodiments of the present technology, when the signal from the wireless communication device 100 is received by a plurality of base stations 200 and 300, each of the base stations 200 and 300 can determine whether the ACK transmission is performed autonomously. Further, each of the base stations 200 and 300 can autonomously decide the transmission timing at which the ACK transmission is performed. Thus, it is possible to reduce interference caused by the ACK transmission from a plurality of base stations.

5. Application Examples

The technology according to the present disclosure can be applied to various products. For example, the wireless communication devices 100, and the base stations 200 and 300 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. Further, the wireless communication devices 100, and the base stations 200 and 300 may be realized as terminals (also referred to as machine type communication (MTCi) terminals) which perform machine to machine (M2M) communication, such as smart meters, vending machine, remote monitoring devices and point of sale (POS) terminals. Furthermore, the wireless communication devices 100, and the base stations 200 and 300 may be wireless communication modules mounted in such terminals (for example, integrated circuit modules configured in one die).

For example, the base stations 200 and 300 may be realized as a wireless LAN access point (which is also referred to as a wireless base station) that has no router function or has a router function. The base stations 200 and 300 may be realized as a mobile wireless LAN router. Furthermore, the base stations 200 and 300 may be wireless communication modules mounted in such devices (for example, integrated circuit modules configured in one die).

5-1. First Application Example

Figure 17:
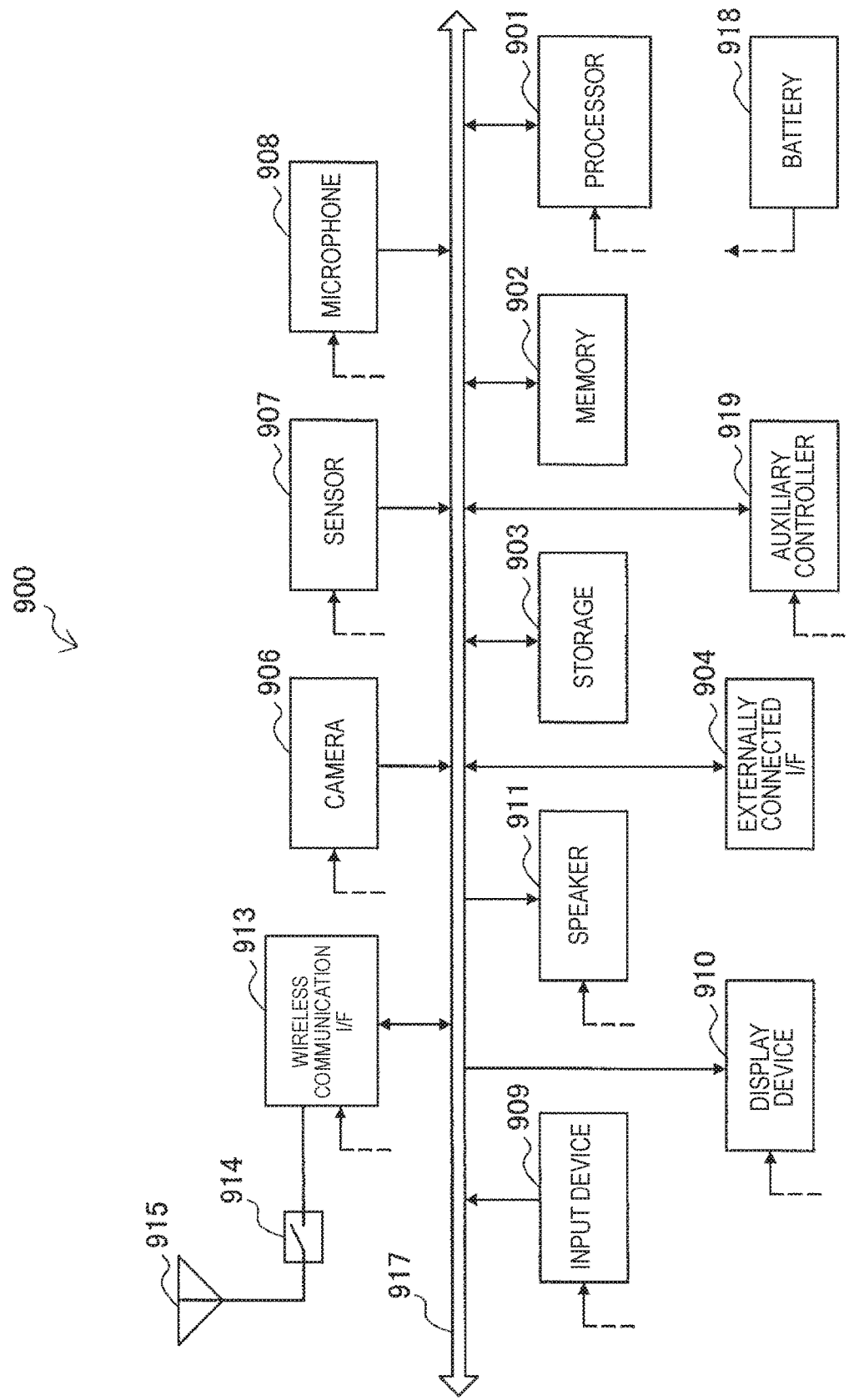
FIG. 17 is a block diagram illustrating an example of a schematic configuration of a smartphone.

FIG. 17 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 17. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 17 via power supply lines partially indicated by dashed lines in the drawing. The auxiliary controller 919 causes, for example, required minimum functions of the smartphone 900 to be operated in a sleep mode.

In the smartphone 900 shown in FIG. 17, the control unit 120 described with reference to FIG. 3 and the control unit 220 described with FIG. 4 may be mounted on the wireless communication interface 913. At least some of the functions may be mounted on the processor 901 or the auxiliary controller 919. For example, when the wireless communication interface 913 causes the base station to perform the ACK transmission decision process, the power consumption of the battery 918 can be reduced.

The smartphone 900 may operate as a wireless access point (software AP) when the processor 901 performs an access point function at an application level. The wireless communication interface 913 may have the wireless access point function.

5-2. Second Application Example

Figure 18:
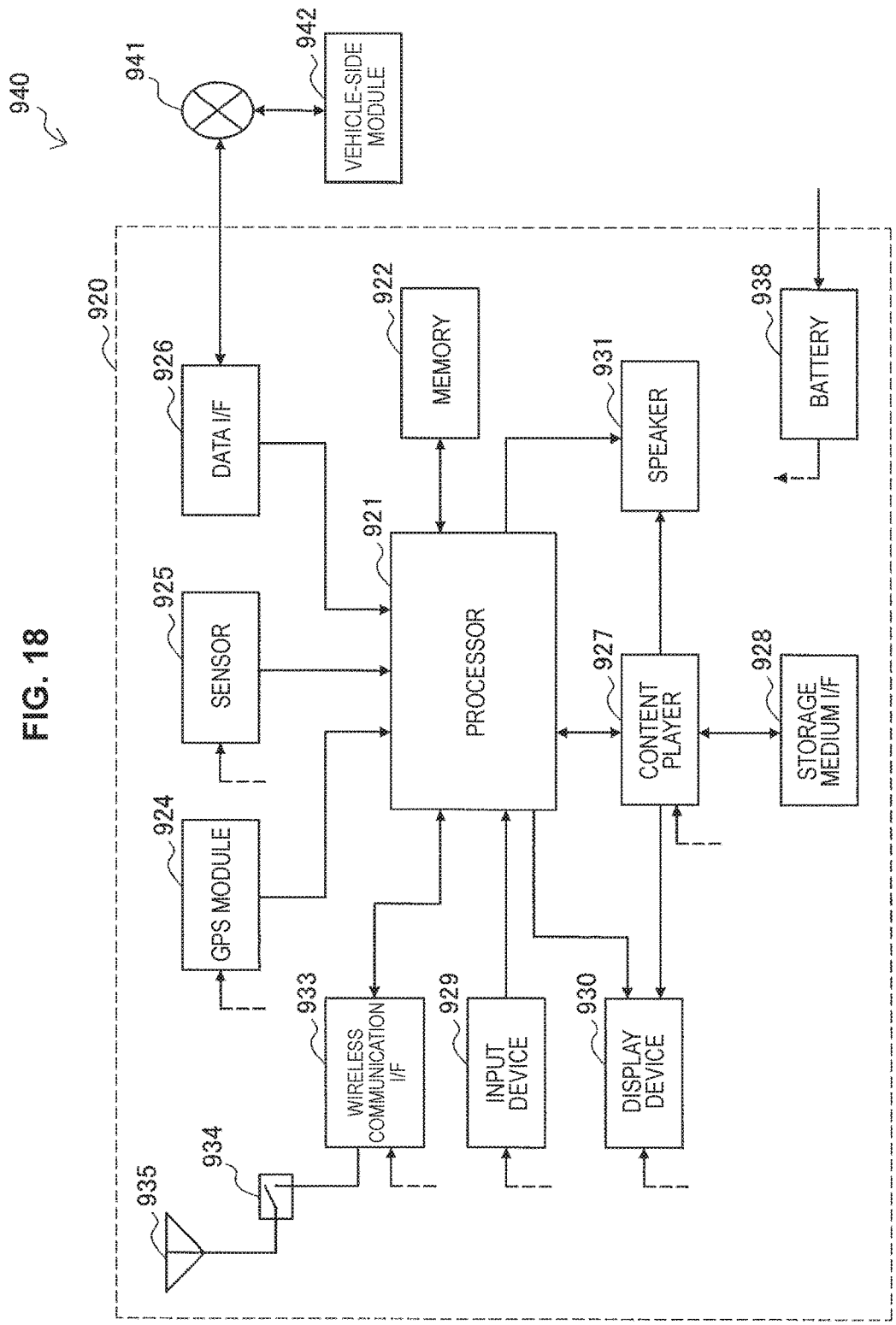
FIG. 18 is a block diagram illustrating an example of a schematic configuration of a car navigation device.

FIG. 18 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 18. In this case, the antenna switch 934 may be omitted from the configuration of the car navigation apparatus 920.

The battery 938 supplies electric power to each of the blocks of the car navigation apparatus 920 shown in FIG. 18 via power supply lines partially indicated by dashed lines in the drawing. In addition, the battery 938 accumulates electric power supplied from the vehicle.

In the car navigation apparatus 920 illustrated in FIG. 18, the control unit 120 described with reference to FIG. 3 and the control unit 220 described with reference to FIG. 4 may be implemented in the wireless communication interface 933. Further, at least some functions may be implemented in the processor 921. For example, when the wireless communication interface 933 causes the base station to perform the ACK transmission decision process, the power consumption of the battery 938 can be reduced.

The wireless communication interface 933 may operate as the above-described base stations 200 and 300 to provide wireless connection to a terminal carried by a user in a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

5-3. Third Application Example

Figure 19:
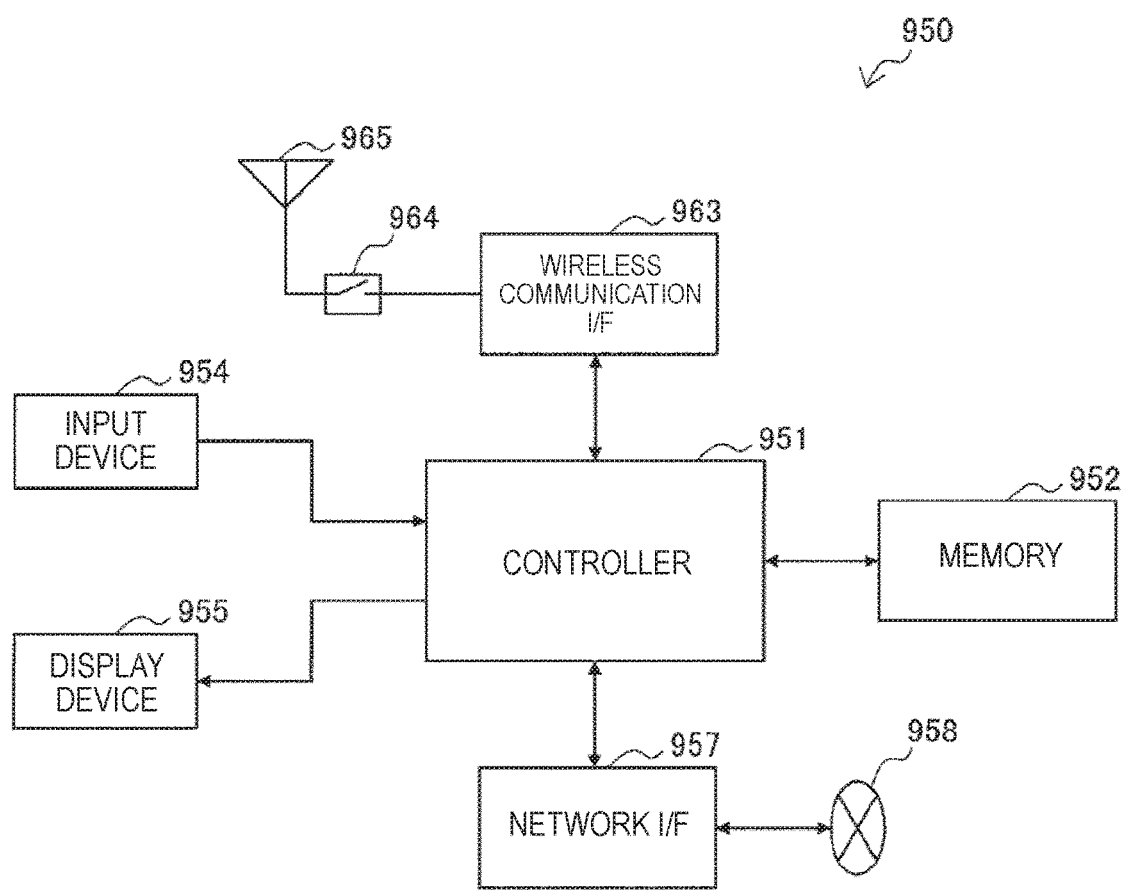
FIG. 19 is a block diagram illustrating an example of a schematic configuration of a wireless access point.

FIG. 19 is a block diagram showing an example of a schematic configuration of a wireless access point 950 to which a technology related to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single or a plurality of antenna elements and is used for transmission and reception of wireless signals from the wireless communication interface 963.

In the wireless access point 950 illustrated in FIG. 19, the control unit 220 described with reference to FIG. 4 may be implemented in the wireless communication interface 963. Further, at least some functions may be implemented in the controller 951. For example, when the wireless communication interface 963 performs the ACK transmission decision process, the power consumption of the battery of the wireless communication device can be reduced.

The above-described embodiments are examples for embodying the present technology and have correspondence relations with factors in embodiments and specific inventive factors in the claims. Similarly, specific inventive factors in the claims and factors in embodiments of the present technology to which the same names as the specific inventive factors are given have correspondence relations. However, the present technology is not limited to the embodiments, but may be realized in various modification forms of the embodiments within the scope without departing from the gist of the present technology.

The processing orders described in the above-described embodiments may be ascertained as methods including the series of orders or may be ascertained as a program causing a computer to execute the series of orders or a recording medium storing the program. As the recording medium, for example, a compact disc (CD), a minidisc (MID), a digital versatile disc (DVD), a memory card, or a Blu-ray (registered trademark) disc can be used.

The advantageous effects described in the present specification are merely examples and are not limitative, and other advantageous effects may be achieved.

Additionally, the present technology may also be configured as below.

(1)

An information processing device, including:

a control unit configured to autonomously control transmission of a response signal to a wireless communication device in response to a signal from the wireless communication device in the case where the signal is received using wireless communication.

(2)

The information processing device according to (1), wherein the control unit decides whether the response signal is transmitted to the wireless communication device on the basis of a received signal strength of the signal.

(3)

The information processing device according to (1) or (2), wherein the control unit decides whether the response signal is transmitted to the wireless communication device using a decision method based on a result obtained by comparing the received signal strength of the signal and a threshold value and a decision method of making a decision randomly.

(4)

The information processing device according to any one of (1) to (3), wherein the control unit randomly decides whether the response signal is transmitted to the wireless communication device.

(5)

The information processing device according to (4), wherein the control unit randomly decides whether the response signal is transmitted to the wireless communication device in the case where the received signal strength of the signal is within a predetermined range.

(6)

The information processing device according to any one of (1) to (5), wherein the control unit randomly decides a timing at which the response signal is transmitted to the wireless communication device.

(7)

The information processing device, the wireless communication device according to (6), wherein the control unit decides the timing at which the response signal is transmitted to the wireless communication device using a decision method based on a result obtained by comparing the received signal strength of the signal to a threshold value and a decision method of making a decision randomly.

(8)

The information processing device, the wireless communication device according to any one of (1) to (7), wherein the control unit decides whether the response signal is transmitted to the wireless communication device on the basis of the received signal strength of the signal, and randomly decides a timing at which the response signal is transmitted to the wireless communication device in the case where the response signal is decided to be transmitted to the wireless communication device.

(9)

A wireless communication device, including:

a control unit configured to designate, in the case where a signal is transmitted to an information processing device using wireless communication, at least one of a decision method of deciding whether the information processing device transmits a response signal to the wireless communication device in response to the signal and a decision method of deciding a transmission timing of the response signal.

(10)

The wireless communication device according to (9), wherein the control unit transmits the signal by including information designating the decision method in the signal.

(11)

The wireless communication device according to (9) or (10), wherein the control unit sets a standby time for the response signal corresponding to the decision method in the case where the decision method of deciding the transmission timing is designated.

(12)

An information processing method, including:

autonomously controlling transmission of a response signal to a wireless communication device in response to a signal from the wireless communication device in the case where the signal is received using wireless communication.

(13)

An information processing method, including:

designating, by an information processing device, in the case where a signal is transmitted to the information processing device using wireless communication, at least one of whether the information processing device transmits a response signal to an own device in response to the signal and a transmission timing of the response signal.

(14)

A program for causing a computer to perform a procedure of autonomously controlling transmission of a response signal to a wireless communication device in response to a signal from the wireless communication device in the case where the signal is received using wireless communication.

(15)

A program for causing a computer to perform a procedure of designating, by an information processing device, in the case where a signal is transmitted to the information processing device using wireless communication, at least one of whether the information processing device transmits a response signal to an own device in response to the signal and a transmission timing of the response signal.

REFERENCE SIGNS LIST 10 communication system
100 wireless communication device
110 communication unit
120 control unit
130 storage unit
140 operation receiving unit
150 display unit
160 power supply unit
200, 300 base station
210 communication unit
220 control unit
230 storage unit
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation apparatus
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle-side module
950 wireless access point
951 controller
952 memory
954 input device
955 display device
957 network interface
958 wired communication network
963 wireless communication interface
964 antenna switch
965 antenna

The invention claimed is:
1. An information processing device, comprising:
a receiver configured to receive a signal from a wireless communication device via wireless communication; and a central processing unit (CPU) configured to:
measure a signal strength of the signal based on position information of the wireless communication device with respect to the information processing device;
compare the measured signal strength of the signal with a first threshold value, wherein the first threshold value is based on an estimation error in a reception power of the information processing device; and
control transmission of a response signal to the wireless communication device based on a result of the comparison of the measured signal strength with the first threshold value.

2. The information processing device according to claim 1,
wherein the CPU is further configured to transmit the response signal to the wireless communication device based on the measured signal strength.

3. The information processing device according to claim 1,
wherein the CPU is further configured to
transmit the response signal to the wireless communication device based on the measured signal strength that is greater than the first threshold value.

4. The information processing device according to claim 3, wherein the CPU is further configured to transmit the response signal to the wireless communication device based on the measured signal strength that is less than the first threshold value and greater than a second threshold value.

5. The information processing device according to claim 4, wherein the CPU is further configured to:
generate a uniform random number based on the measured signal strength that is less than the first threshold value and the second threshold value; and
transmit the response signal to the wireless communication device based on the uniform random number that is greater a third threshold value.

6. The information processing device according to claim 1,
wherein the CPU is further configured to determine a time of transmission of the response signal to the wireless communication device.

7. The information processing device according to claim 6,
wherein the CPU is further configured to:
generate a uniform random number;
transmit the response signal at a first time to the wireless communication device based on the measured signal strength that is greater than a second threshold value and based on the uniform random number that is greater than a third threshold value; and
transmit the response signal at a second time to the wireless communication device based on the measured signal strength that is greater than the second threshold value and based on the uniform random number that is less than the third threshold value.

8. The information processing device according to claim 1,
wherein the CPU is further configured to:
generate a uniform random number;
transmit the response signal at a first time to the wireless communication device based on the measured signal strength that is less than a second threshold value, and based on the uniform random number that is greater than a third threshold value; and
transmit the response signal at a second time to the wireless communication device based on the measured signal strength that is less than the second threshold value and based on the uniform random number that is less than the third threshold value.

9. A wireless communication device, comprising:
a central processing unit (CPU) configured to:
determine whether a degree of importance of a signal is higher than a threshold value based on content of the signal;
designate a first field and a second field in the signal based on the determination that the degree of importance is higher than the threshold value; and
transmit the signal to an information processing device via wireless communication, wherein
the first field indicates first information to cause the information processing device to execute a first decision process,
the first decision process controls transmission of a response signal to the wireless communication device,
the second field indicates second information to cause the information processing device to execute a second decision process, and
the second decision process controls a transmission timing of the response signal.

10. The wireless communication device according to claim 9,
wherein the CPU is further configured to set a standby time for the response signal based on the designation of the second field in the signal transmitted to the information processing device.

11. An information processing method, comprising:
receiving, by an information processing device, a signal from a wireless communication device via wireless communication;
measuring a signal strength of the signal based on position information of the wireless communication device with respect to the information processing device;
comparing the measured signal strength of the signal with a first threshold value, wherein the first threshold value is based on an estimation error in a reception power of the information processing device; and
controlling transmission of a response signal to the wireless communication device based on a result of the comparison of the measured signal strength with the first threshold value.

12. An information processing method, comprising:
determining whether a degree of importance of a signal is higher than a threshold value based on content of the signal;
designating, by a wireless communication device, a first field and a second field in the signal based on the determination that the degree of importance is higher than the threshold value; and
transmitting the signal to an information processing device via wireless communication, wherein
the first field indicates first information to cause the information processing device to execute a first decision process,
the first decision process controls transmission of a response signal to the wireless communication device,
the second field indicates second information to cause the information processing device to execute a second decision process, and the second decision process controls a transmission timing of the response signal.

13. A non-transitory computer-readable medium having stored thereon, computer executable instructions, which when executed by a computer, cause the computer to execute operations, the operations comprising:
receiving a signal from a wireless communication device via wireless communication;
measuring a signal strength of the signal based on position information of the wireless communication device with respect to an information processing device;
comparing the measured signal strength of the signal with a first threshold value, wherein the first threshold value is based on an estimation error in a reception power of the information processing device; and
controlling transmission of a response signal to the wireless communication device based on a result of the comparison of the measured signal strength with the first threshold value.

14. A non-transitory computer-readable medium having stored thereon, computer executable instructions, which when executed by a computer, cause the computer to execute operations, the operations comprising:
determining whether a degree of importance of a signal is higher than a threshold value based on content of the signal;
designating a first field and a second field in the signal based on the determination that the degree of importance is higher than the threshold value; and
transmitting the signal to an information processing device via wireless communication, wherein
the first field indicates first information to cause the information processing device to execute a first decision process,
the first decision process controls transmission of a response signal to a wireless communication device,
the second field indicates second information to cause the information processing device to execute a second decision process, and
the second decision process controls a transmission timing of the response signal.

15. An information processing device, comprising:
a receiver configured to receive a signal from a wireless communication device via wireless communication; and
a central processing unit (CPU) configured to:
determine a signal strength of the signal;
compare the determined signal strength of the signal with a first threshold value, wherein the first threshold value is based on position information associated with the information processing device;
control transmission of a response signal to the wireless communication device based on a result of the comparison of the determined signal strength with the first threshold value;
generate a uniform random number;
transmit the response signal at a first time to the wireless communication device based on the determined signal strength that is less than a second threshold value, and based on the uniform random number that is greater than a third threshold value; and
transmit the response signal at a second time to the wireless communication device based on the determined signal strength that is less than the second threshold value and based on the uniform random number that is less than the third threshold value.

* * * * *